United States Patent
Kataishi et al.

(10) Patent No.: US 10,870,401 B2
(45) Date of Patent: Dec. 22, 2020

(54) IMAGING DEVICE

(71) Applicant: HITACHI AUTOMOTIVE SYSTEMS, LTD., Hitachinaka (JP)

(72) Inventors: Tomoyuki Kataishi, Hitachinaka (JP); Hidenori Shinohara, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/325,370

(22) PCT Filed: Jul. 28, 2017

(86) PCT No.: PCT/JP2017/027362
§ 371 (c)(1),
(2) Date: Feb. 13, 2019

(87) PCT Pub. No.: WO2018/055905
PCT Pub. Date: Mar. 29, 2018

(65) Prior Publication Data
US 2019/0193649 A1 Jun. 27, 2019

(30) Foreign Application Priority Data
Sep. 21, 2016 (JP) .................................. 2016-183630

(51) Int. Cl.
*B60R 11/04* (2006.01)
*G03B 17/56* (2006.01)
(Continued)

(52) U.S. Cl.
CPC .............. *B60R 11/04* (2013.01); *G03B 17/56* (2013.01); *G03B 17/561* (2013.01); *G03B 19/07* (2013.01);
(Continued)

(58) Field of Classification Search
None
See application file for complete search history.

(56) References Cited

U.S. PATENT DOCUMENTS

| 2012/0207461 A1 | 8/2012 | Okuda |
|---|---|---|
| 2015/0041510 A1 | 2/2015 | Frenzel |

(Continued)

FOREIGN PATENT DOCUMENTS

| DE | 10 2012 101 781 A1 | 9/2013 |
|---|---|---|
| DE | 10 2014 012 001 A1 | 2/2016 |

(Continued)

OTHER PUBLICATIONS

PCT International Search Report (along with its English Translation) and PCT Written Opinion (Japanese Language only) issued in corresponding application PCT/JP2017/027362 dated Nov. 21, 2017.

(Continued)

*Primary Examiner* — Quan Pham
(74) *Attorney, Agent, or Firm* — Foley & Lardner LLP

(57) ABSTRACT

The present invention provides an imaging device wherein an imaging unit can be stably supported by a bracket and adverse effects on the imaging unit caused by differences in the amount of thermal expansion between the bracket and the imaging unit can be reduced. This imaging device 1 is provided with an imaging unit 10 attachable to the bracket. The imaging unit 10 is provided with a plurality of supported parts 15 to be supported by the bracket. The supported parts 15 are provided on both ends of the imaging unit 10 in the width direction DW crossing the light axis OA direction at one end of the imaging unit 10 in the light axis OA direction, and in the center part in the width direction DW at the other end of the imaging unit 10 in the light axis OA direction. The supported parts 15 have supported points 15a, which are supported by the bracket, and load points 15b, which receive (Continued)

the biasing force operating toward the supported points 15a from the bracket.

6 Claims, 18 Drawing Sheets

(51) Int. Cl.
*H04N 5/225* (2006.01)
*G03B 19/07* (2006.01)
*B60R 11/00* (2006.01)

(52) U.S. Cl.
CPC ........... *H04N 5/225* (2013.01); *H04N 5/2252* (2013.01); *B60R 2011/0026* (2013.01)

(56) References Cited

U.S. PATENT DOCUMENTS

| | | |
|---|---|---|
| 2016/0006911 A1 | 1/2016 | Kimura et al. |
| 2016/0009230 A1 | 1/2016 | Miyado et al. |
| 2017/0217382 A1* | 8/2017 | Gunes ...................... B60R 1/00 |
| 2017/0240120 A1* | 8/2017 | Krug ..................... H04N 5/2252 |
| 2017/0277020 A1* | 9/2017 | Kasai ................... G03B 17/561 |
| 2018/0154842 A1* | 6/2018 | Naoi ...................... B60R 11/04 |
| 2018/0361949 A1* | 12/2018 | Okuda ................... B60R 11/04 |

FOREIGN PATENT DOCUMENTS

| | | |
|---|---|---|
| JP | 2012-166615 A | 9/2012 |
| JP | 2013-207571 A | 10/2013 |
| JP | 2015-000713 A | 1/2015 |
| JP | 2016-014564 A | 1/2016 |
| JP | 2016-016830 A | 2/2016 |

OTHER PUBLICATIONS

Office Action in corresponding Japanese Patent Application No. 2018-540667 dated Nov. 5, 2019 with English translation.
Extended European Search Report issued in corresponding European Patent Application No. 17852686.9 dated Mar. 19, 2020.

* cited by examiner

IMAGING DEVICE

CROSS-REFERENCE TO RELATED APPLICATIONS

This application is a National Phase of International Patent Application No. PCT/JP2017/027362 filed on Jul. 28, 2017, which claims priority to Japanese Patent Application No. 2016-183630 filed on Sep. 21, 2016. The contents of these applications are herein incorporated by reference in their entirety.

TECHNICAL FIELD

The present invention relates to an imaging device.

BACKGROUND ART

Conventionally, there is known an invention relating to an attachment structure of an in-vehicle camera configured to attach an in-vehicle camera onto an inner surface of a windshield of a vehicle (for example, see the following PTL 1). An object of the invention described in PTL 1 is to provide an attachment structure of an in-vehicle camera capable of easily, efficiently, and inexpensively performing maintenance relating to a pressing force and/or replacement of the in-vehicle camera without requiring replacement of a bracket and a windshield to which the bracket is fixed (see the document, the abstract, and the like).

The attachment structure of the conventional in-vehicle camera has a first bracket and a second bracket attached to the first bracket and holding the in-vehicle camera. The first bracket has a support portion and a first one-way engagement portion. The second bracket has a pressing portion and a second one-way engagement portion. The pressing portion elastically presses a pressed portion of the in-vehicle camera against the support portion to hold the pressed portion between the pressing portion and the support portion. The second one-way engagement portion engages with the first one-way engagement portion to prevent the second bracket from being displaced and to transmit a reaction force of pressing from the second bracket to the first bracket.

CITATION LIST

Patent Literature

PTL 1: JP 2016-16830 A

SUMMARY OF INVENTION

Technical Problem

In the attachment structure of the conventional in-vehicle camera, a pair of the first pressed portions is spaced from each other on the right and left in the vicinity of a front end of the in-vehicle camera. In addition, a pair of the right and left second pressed portions is spaced rearward, respectively, from the corresponding first pressed portions (See Claim 6, paragraph 0048 of Detailed Description of the Invention, and FIG. 4 and the like of PTL 1).

In this manner, when the in-vehicle camera is supported by the four or more pressed portions spaced apart from each other in the front-rear direction and the right-left direction, the in-vehicle camera is likely to be unstable due to a positional error between the pressed portion of the in-vehicle camera and the support portion of the first bracket. In addition, for example, when differences in the amount of thermal expansion occur between the bracket and a casing of the in-vehicle camera due to, for example, a material or a temperature difference, there is a risk that stress may act on the in-vehicle camera to distort the casing, which may adversely affect the performance of the in-vehicle camera.

The present invention has been made in view of the above problems, and an object thereof is to provide an imaging device in which an imaging unit can be stably supported by a bracket and adverse effects on the imaging unit caused by differences in the amount of thermal expansion between the bracket and the imaging unit can be reduced.

Solution to Problem

In order to achieve the above object, the imaging device of the present invention is an imaging device provided with an imaging unit attachable to a bracket, in which the imaging unit is provided with a plurality of supported parts to be supported by the bracket, the supported parts are provided on both ends of the imaging unit in a width direction crossing a light axis direction at one end of the imaging unit in the light axis direction, and in a center part in the width direction at another end of the imaging unit in the light axis direction, and the supported parts have supported points, which are supported by the bracket, and load points, which receive a biasing force operating toward the supported points from the bracket.

Advantageous Effects of Invention

In the imaging device of the present invention, the plurality of supported parts of the imaging unit to be supported by the bracket is arranged on both the ends of the imaging unit in the width direction at one end of the imaging unit in the light axis direction, and in the center part of the imaging unit in the width direction at the other end of the imaging unit in the light axis direction. As a result, the plurality of supported parts of the imaging unit is arranged at or near a position of an apex of an isosceles triangle having a base substantially parallel to the width direction of the imaging unit and a height in a direction along the light axis direction of the imaging unit. Therefore, the imaging unit can be stably supported by the bracket at the plurality of supported parts as compared with the conventional case where the four or more pressed portions spaced apart from each other at the front, rear, right, and left of the in-vehicle camera are supported by the bracket.

Further, in the imaging device of the present invention, each of the supported parts of the imaging unit supported by the bracket has the supported point supported by the bracket and the load point which receives the biasing force operating from the bracket toward the supported point. As a result, it is possible to reduce a portion where the bracket and the imaging unit come into contact with each other, and it is possible to reduce the adverse effect on the imaging unit by mitigating the stress at the time of attaching the imaging unit to the bracket or mitigating the stress caused by the differences in the amount of thermal expansion between the bracket and the imaging unit.

DESCRIPTION OF EMBODIMENTS

Hereinafter, embodiments of an imaging device of the present invention will be described with reference to the drawings.

First Embodiment

Figure 1:
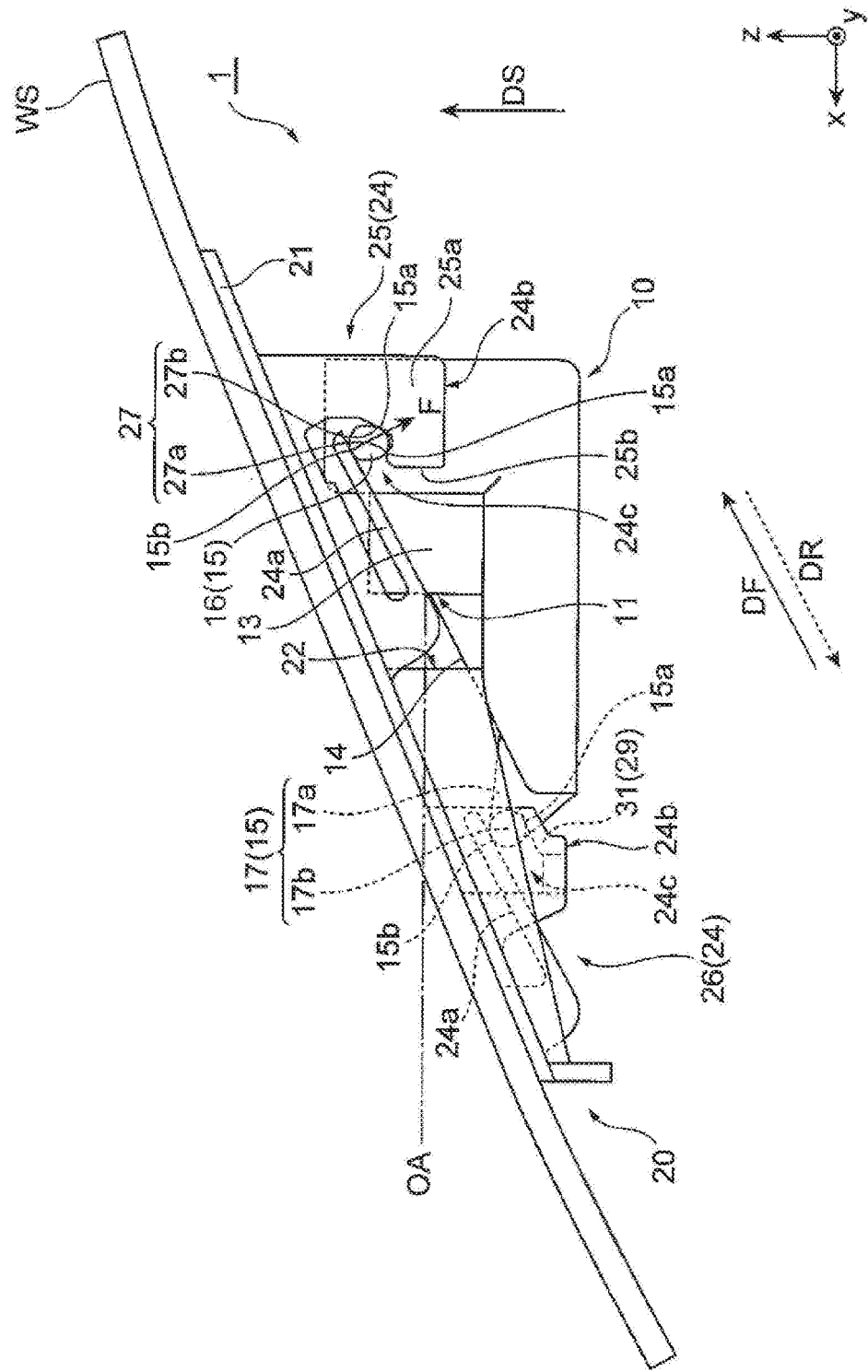
FIG. 1 is a side view of an imaging device according to a first embodiment of the present invention.

FIG. 1 is a side view of an imaging device 1 according to a first embodiment of the present invention. The imaging device 1 of the present embodiment is, for example, an in-vehicle imaging device 1 to be mounted on a vehicle such as an automobile. For example, the imaging device 1 is mounted on an upper part of a windshield WS of the vehicle, and is used to capture an image of the front of the vehicle via the windshield WS and to obtain a distance and velocity of the captured object. The respective drawings including FIG. 1 illustrate an orthogonal coordinate system in which a roll axis of the vehicle is an x axis, a pitch axis is a y axis, and a yaw axis is a z axis.

This imaging device 1 is provided with an imaging unit 10 attachable to a bracket 20. In addition, the imaging device 1 may be provided with the bracket 20 to which the imaging unit 10 can be attached slidably in a predetermined attachment direction DF. In the bracket 20, for example, a plate-shaped main body 21 is arranged at a predetermined position on an upper portion of the windshield WS to be inclined with respect to the roll axis (x axis) and the yaw axis (z axis) of the vehicle along an inner surface of the windshield WS and is fixed to the inner surface of the windshield WS by an adhesive or the like.

The attachment direction DF of the imaging unit 10 with respect to the bracket 20 is a direction that extends substantially along inclinations of the main body 21 and the windshield WS of the bracket 20 and is a direction inclined with respect to the roll axis (x axis) and the yaw axis (z axis) of the vehicle. Incidentally, in the attachment direction DF of the imaging unit 10, a negative side in the x-axis direction which is a positive side in the z-axis direction, that is, a rear side of the vehicle which is an upper side in the vertical direction is defined as the front, and a positive side in the x-axis direction which is a negative side in the z-axis direction, that is, a front side of the vehicle which is a lower side in the vertical direction is defined as the rear.

A support direction DS of the imaging unit 10 using the bracket 20 is a direction crossing the attachment direction DF of the imaging unit 10 and is a direction substantially parallel to the yaw axis (z axis) of the vehicle. The support direction DS of the imaging unit 10 is a direction along the vertical direction of the vehicle traveling on a flat road surface having no inclination, for example. For example, the attachment direction DF of the imaging unit 10 has an inclination angle with respect to the roll axis (x axis) of the vehicle smaller than an inclination angle with respect to the yaw axis (z axis) of the vehicle.

Incidentally, an inclination angle of the attachment direction DF of the imaging unit 10 with respect to a light axis OA, which is substantially parallel to the roll axis (x axis) is preferably larger than an inclination angle of the main body 21 of the bracket 20 with respect to the light axis OA from the viewpoint of facilitating attachment and detachment of the imaging unit 10 with respect to the bracket 20. In addition, when the bracket 20 is attached to the ceiling of the vehicle, the attachment direction DF of the imaging unit 10 with respect to the bracket 20 can be set to, for example, a direction along the ceiling of the vehicle.

Figure 2:
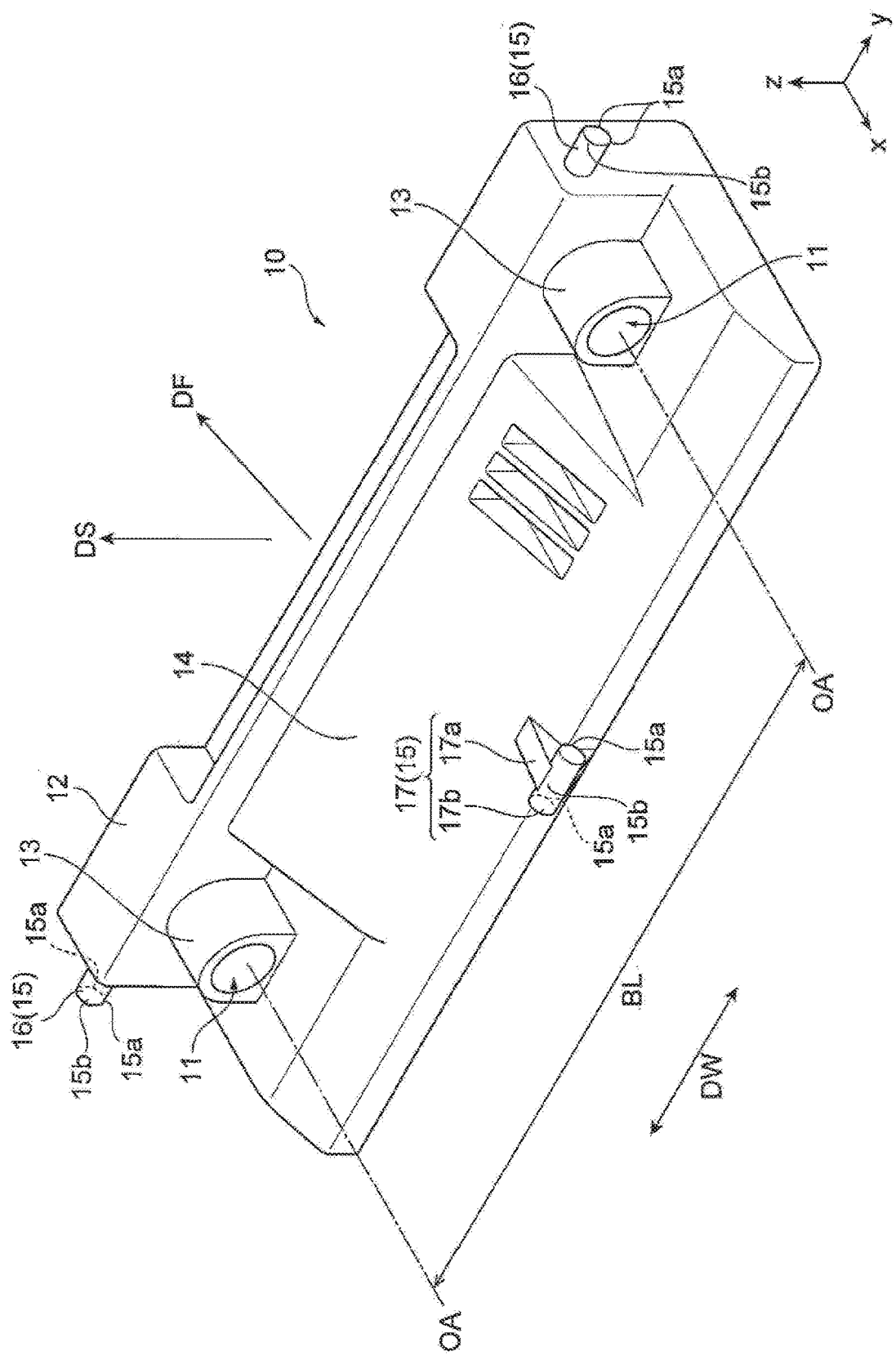
FIG. 2 is a perspective view from the upper side of an imaging unit of the imaging device illustrated in FIG. 1.
Figure 3:
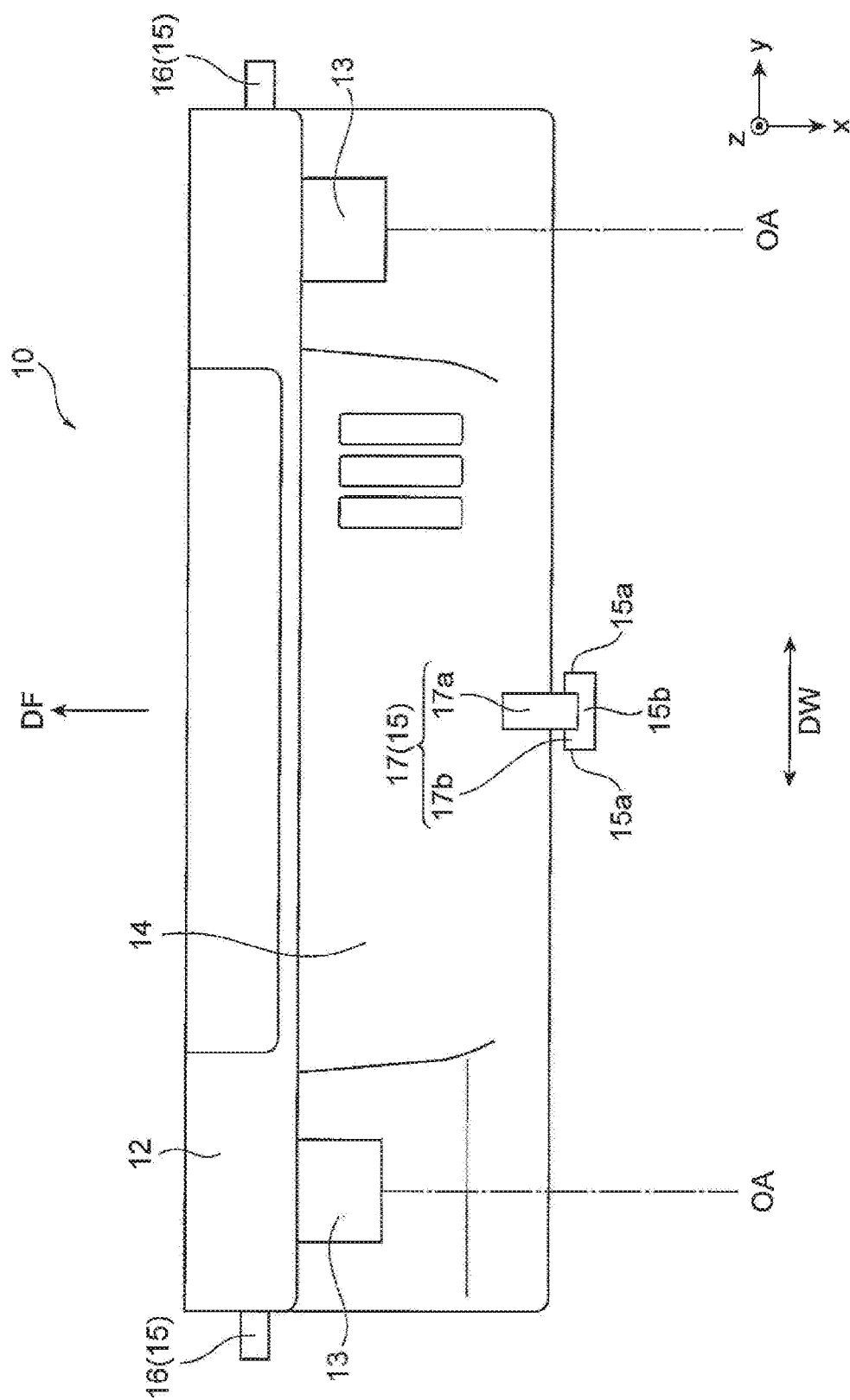
FIG. 3 is a top view of the imaging unit illustrated in FIG. 2.
Figure 4:
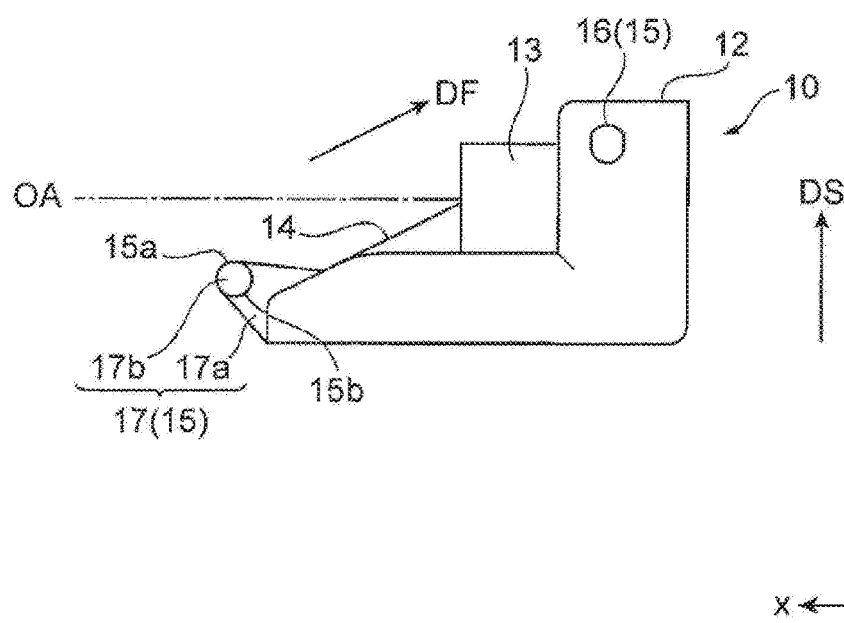
FIG. 4 is a side view of the imaging unit illustrated in FIG. 2.

FIG. 2 is a perspective view from the upper side of the imaging unit 10 illustrated in FIG. 1. FIG. 3 is a top view of the imaging unit 10 illustrated in FIG. 2. FIG. 4 is a side view of the imaging unit 10 illustrated in FIG. 2. In the illustrated example, the imaging unit 10 is a stereo camera including a pair of cameras 11 aligned in the width direction (y-axis direction) of the imaging unit 10. Incidentally, the imaging unit 10 is not limited to the stereo camera, and may be a monocular camera.

The imaging unit 10 includes the pair of cameras 11 and a casing 12 that holds the pair of cameras 11. For example, the imaging unit 10 is positioned with high precision such that the mutually parallel light axes OA of the pair of cameras 11 extend along the roll axis (x axis) which is the front-rear direction of the vehicle, and is fixed to the windshield WS via the bracket 20. That is, the light axis OA direction of the imaging unit 10 is a direction crossing the attachment direction DF and the support direction DS of the imaging unit 10. Although not illustrated, each of the cameras 11 includes, for example, a lens, a lens barrel, an imaging element, an imaging substrate, and the like, and is supported and fixed by the casing 12.

The casing 12 accommodates and holds the pair of cameras 11 precisely positioned such that the light axes OA are parallel to each other, and accommodates, for example, a circuit board having a signal processing circuit connected to an imaging circuit on the imaging board of each of the cameras 11.

The casing 12 is made of, for example, a metal such as stainless steel as a material and is formed in a shape extending in one direction, the shape having a maximum dimension in the width direction DW perpendicularly crossing the light axis OA of the pair of cameras 11, that is, in a direction parallel to a baseline length BL which is a distance between the light axes OA of the pair of cameras 11. The casing 12 defines an outer shape of the imaging unit 10, and the width direction DW, which is the longitudinal direction of the casing 12, is the width direction DW of the imaging unit 10. The casing 12 holds the pair of cameras 11 in camera holding parts 13 provided on both ends in the width direction DW. As a result, the baseline length BL of the pair of cameras 11 of the imaging unit 10 is secured.

As illustrated in FIG. 1, in the casing 12, a height of a portion on the front side of the vehicle, that is, a dimension in the z axis direction of a portion on the positive side of the x axis is smaller than a height of a portion on the rear side of the vehicle, that is, a dimension in the z axis direction of the portion on the negative side of the x axis in accordance with the inclination of the windshield WS. That is, the imaging unit 10 has a height of a rear end in the attachment direction DF lower than a height of a front end in the attachment direction DF. In addition, the casing 12 has an inclined surface 14 along the attachment direction DF of the imaging unit 10 between the pair of camera holding parts 13.

The imaging unit 10 has a plurality of supported parts 15 provided at different positions of the casing 12 and supported by the bracket 20. For example, the plurality of supported parts 15 is provided on both ends of the imaging unit 10 in the width direction DW crossing the light axis OA direction at one end of the imaging unit 10 in the light axis OA direction, and in a center part in the width direction DW at the other end of the imaging unit 10 in the light axis OA direction.

In the illustrated example, the plurality of supported parts 15 of the imaging unit 10 has a pair of first supported parts 16 provided at a rear end of the imaging unit 10 in the light axis OA direction and one second supported part 17 provided at a front end of the imaging unit 10 in the light axis OA direction. Here, the front of the imaging unit 10 in the light axis OA direction is a direction facing the front of the vehicle in a traveling direction in the light axis OA direction. In addition, the rear of the imaging unit 10 in the light axis OA direction is a direction facing the rear of the vehicle in the traveling direction in the light axis OA direction.

Incidentally, the arrangement of the plurality of supported parts 15 of the imaging unit 10 is not limited to the illustrated example. For example, the imaging unit 10 may have the pair of first supported parts 16 at the front end in the light axis OA direction and the one second supported part 17 at the rear end in the light axis OA direction. In addition, the imaging unit 10 may have the plurality of supported parts 15 on both the ends in the width direction DW at one end in the light axis OA direction, respectively, and may have the plurality of supported parts 15 in the center part in the width direction DW at the other end in the light axis OA direction.

Each of the supported parts 15 includes a supported point 15a supported by the bracket 20 and a load point 15b which receives a biasing force F operating toward the supported point 15a from the bracket 20 as will be described in detail later. In addition, at least a part of the supported part 15 can have a columnar shape extending in an axial direction along the width direction DW of the imaging unit 10. In the illustrated example, the axial direction of the columnar portion of each of the supported parts 15 is substantially parallel to the width direction DW of the imaging unit 10, that is, the pitch axis (y axis) of the vehicle.

In the imaging unit 10, the first supported parts 16 provided on both the ends of the imaging unit 10 in the width direction DW at the front end in the attachment direction DF, that is, the rear end in the light axis OA direction protrude toward the outer side of the casing 12 from both side surfaces of the casing 12 in the width direction DW of the imaging unit 10. In the illustrated example, the pair of cameras 11 of the imaging unit 10 is arranged on both the ends of the imaging unit 10 in the width direction W to be adjacent to the pair of first supported parts 16. The pair of first supported parts 16 can be provided symmetrically with respect to a center line parallel to the light axis OA of the imaging unit 10.

Here, the fact that the camera 11 is arranged to be adjacent to the first supported part 16 means that the first supported part 16 is provided in the vicinity of the camera 11, for example, in the vicinity of the camera holding part 13 of the casing 12. Here, the "vicinity of the camera 11" means that a distance from the camera 11 is within a predetermined distance range, for example, equal to or smaller than ½, more preferably equal to or smaller than ⅓, and still more preferably equal to or smaller than ¼ of the baseline length BL. Incidentally, a distance between the first supported part 16 and the camera 11 is, for example, equal to or smaller than ⅕ of the baseline length BL in the illustrated example.

As illustrated in FIGS. 1 to 4, the first supported part 16 has the supported point 15a supported by the bracket 20 and the load point 15b which receives the biasing force F operating toward the supported point 15a from the bracket 20.

For example, the first supported part 16 can have the two supported points 15a aligned in the light axis OA direction and the attachment direction DF of the imaging unit 10. The supported point 15a of the first supported part 16 is positioned at a lower end of the first supported part 16 in the support direction DS of the imaging unit 10. The load point 15b of the first supported part 16 is positioned at an upper end of the first supported part 16 in the support direction DS of the imaging unit 10. In addition, the load point 15b of the first supported part 16 is provided between the two supported points 15a in the attachment direction DF of the imaging unit 10.

A cross-sectional shape of the columnar first supported part 16 is preferably a shape having a columnar curved surface in, for example, a circle, an ellipse, an oval, or the like from the viewpoint of supporting and fixing the imaging unit 10 stably reliably by the bracket 20 and facilitating attachment and detachment of the imaging unit 10. That is, the first supported part 16 preferably has a shape of, for example, a columnar shape, an elliptical columnar shape, or a long cylindrical shape.

As described above, the second supported part 17 is provided in the center part in the width direction DW at the rear end of the imaging unit 10 in the attachment direction DF, that is, the front end in the light axis OA direction. Here, the center part of the imaging unit 10 in the width direction DW can be defined as, for example, the center of the imaging unit 10 in the width direction DW and a portion closer to the center than both the ends of the imaging unit 10 in the width direction DW.

The second supported part 17 can have, for example, a first portion 17a and a second portion 17b. The first portion 17a protrudes forward in the light axis OA direction from the center part of the imaging unit 10 in the width direction DW. The second portion 17b extends from the front end of the first portion 17a in the light axis OA direction of the imaging unit 10 to both the sides of the imaging unit 10 in the width direction DW.

In addition, the second portion 17b of the second supported part 17 is provided in a cylindrical shape extending in a direction perpendicular to the attachment direction DF and the support direction DS of the imaging unit 10 in the illustrated example, which is similar to the first supported part 16. In addition, the shape of the second portion 17b of the second supported part 17 is preferably, for example, a columnar shape, an elliptical columnar shape, or a long cylindrical shape.

The first portion 17a of the second supported part 17 is connected to a center part of the columnar second portion 17b in the axial direction and extends in a direction perpendicular to the axial direction of the second portion 17b. As a result, the second supported part 17 is formed in a substantially T shape in a top view as illustrated in FIG. 3.

The second supported part 17 has the pair of supported points 15a on both the ends of the imaging unit 10 in the width direction DW at a lower end of the second portion 17b in the support direction DS of the imaging unit 10. In addition, the second supported part 17 has the single load point 15b in the center part of the imaging unit 10 in the width direction DW at an upper end of the second portion 17b in the support direction DS of the imaging unit 10.

That is, the second supported part 17 can have the pair of supported points 15a and the single load point 15b between the pair of supported points 15a, for example, in the width direction DW of the imaging unit 10. Incidentally, the configuration of the second supported part 17 is not limited to the illustrated configuration.

Figure 5:
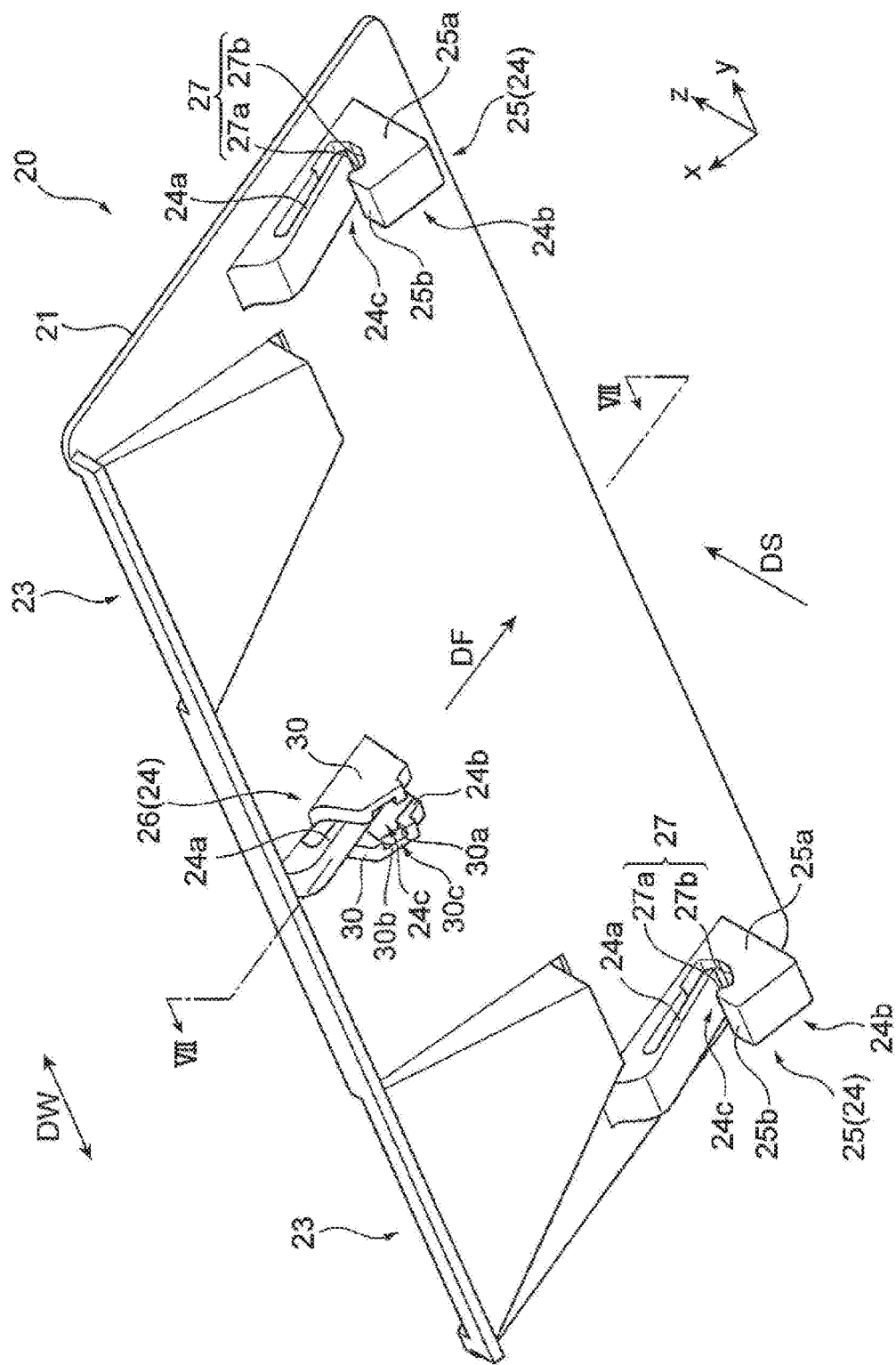
FIG. 5 is a perspective view from the lower side of a bracket of the imaging device illustrated in FIG. 1.
Figure 6:
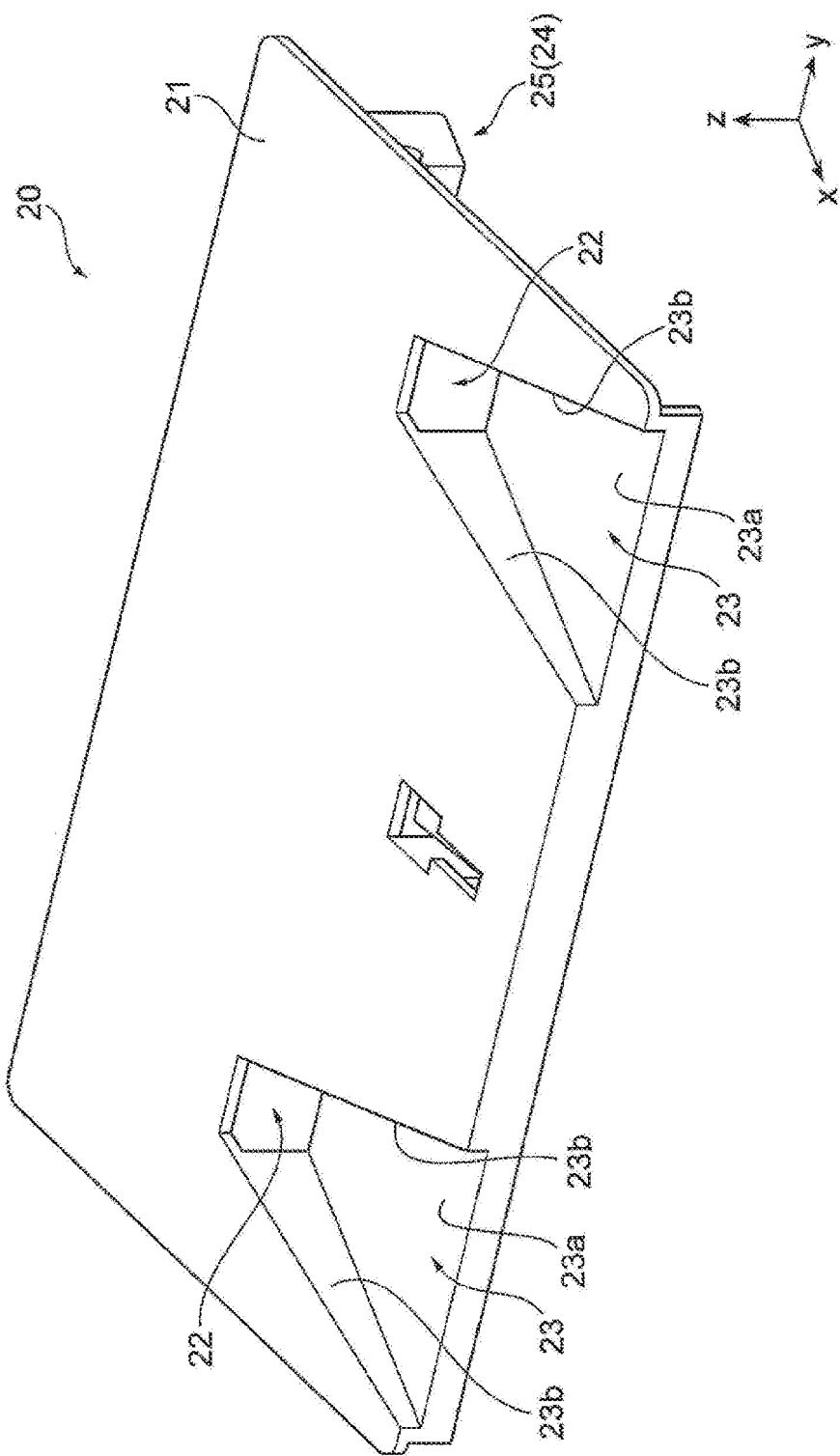
FIG. 6 is a perspective view from the upper side of the bracket of the imaging device illustrated in FIG. 1.

FIG. 5 is a perspective view from the lower side of the bracket 20 of the imaging device 1 illustrated in FIG. 1. FIG. 6 is a perspective view from the upper side of the bracket 20 illustrated in FIG. 5.

The bracket 20 is, for example, an integrally molded product molded by integrally molding a resin material. The bracket 20 has: the main body 21 on a flat plate; for example, a pair of openings 22 which is open in the main body 21 and exposes the pair of cameras 11 of the imaging unit 10; a pair of light shielding parts 23 recessed on an upper surface of the main body 21; and a plurality of support structural parts 24 protruding from a lower surface of the main body 21 and supporting the plurality of supported parts 15 of the imaging unit 10.

As illustrated in FIG. 1, the main body 21 is bonded and fixed to an upper part on the inner side of the windshield WS of the vehicle, for example, via an adhesive. A slight gap is formed between a front end of the main body 21 in the light axis OA direction of the imaging unit 10, that is, between a rear end of the main body 21 in the attachment direction DF of the imaging unit 10 and the windshield WS. Since air flows through this gap, dew condensation with respect to the imaging device 1 is prevented.

As illustrated in FIG. 1, the pair of openings 22 is open at positions corresponding to the pair of cameras 11 of the imaging unit 10 attached to the bracket 20, and is surrounded by the light shielding parts 23 as illustrated in FIG. 6. The pair of openings 22 exposes the pair of cameras 11 of the imaging unit 10 toward the windshield WS, thereby enabling capturing the front of the vehicle via the windshield WS by the imaging unit 10.

As illustrated in FIG. 6, the light shielding part 23 is a recessed portion that causes the upper surface of the main body 21 to subside downward as viewed from the upper surface side of the main body 21 and is provided in a radial shape from the opening 22 toward the front of the vehicle in the light axis OA direction of the imaging unit 10. As illustrated in FIG. 5, a portion of the lower surface of the main body 21 corresponding to the light shielding part 23 protrudes downward.

As illustrated in FIG. 6, a bottom surface 23a and a side surface 23b of the light shielding part 23 are provided in a radial shape that surrounds a lower side and lateral sides of the opening 22 and is inclined to be away from the light axis OA as being away from the camera 11 so as not to block the field of view of the camera 11 of the imaging unit 10. The light shielding part 23 shields light reflected from the interior of the vehicle, for example, and reduces the influence of the reflected light on the camera 11.

As illustrated in FIGS. 1 and 5, the plurality of support structural parts 24 protrudes from the lower surface of the main body 21 and supports the plurality of supported parts 15 of the imaging unit 10. In the illustrated example, the bracket 20 has three support structural parts 24 corresponding to the three supported parts 15 of the imaging unit 10. The number of the support structural parts 24 of the bracket 20 is not limited to three and may be two, four or more, for example, so as to correspond to the number of the supported parts 15 of the imaging unit 10.

Although details will be described later, the plurality of support structural parts 24 of the bracket 20 can include at least one first support structural part 25 from the viewpoint of stably and reliably supporting the imaging unit 10 with the bracket 20. That is, all the plurality of support structural parts 24 of the bracket 20 may be the first support structural parts 25, or may include the three or more first support structural parts 25 so as to correspond to the supported parts 15 of the imaging unit 10.

Similarly, the plurality of support structural parts 24 of the bracket 20 can include at least one second support structural part 26 from the viewpoint of facilitating the detachment of the imaging unit 10 from the bracket 20 although details will be described later. That is, all the plurality of support structural parts 24 of the bracket 20 may be the second support structural parts 26, or may include the two or more second support structural parts 26 so as to correspond to the supported parts 15 of the imaging unit 10.

In the illustrated example, the three support structural parts 24 of the bracket 20 include the pair of first support structural parts 25 supporting the pair of first supported parts 16 of the imaging unit 10 and the single second support structural part 26 supporting the single second supported part 17 of the imaging unit 10. Each of the support structural parts 24 has a biasing part 24a that applies the biasing force F on the load point 15b of the supported part 15 and a supporting part 24b that operates a drag against the biasing force F on the supported point 15a of the supported part 15.

The biasing part 24a extends along the light axis OA direction of the imaging unit 10, more precisely, extends substantially in parallel with the attachment direction DF of the imaging unit 10. Here, "along the light axis OA direction" means that an angle with respect to the light axis OA is, for example, smaller than 45°, and more preferably 30° or smaller. The biasing part 24a has one end in the light axis OA direction of the imaging unit 10, that is, a rear end in the attachment direction DF of the imaging unit 10 that serves as a fixed end, and the other end in the light axis OA direction of the imaging unit 10, that is, a front end in the attachment direction DF of the imaging unit 10 that serves as a free end.

An interval between the free end of the biasing part 24a and the supporting part 24b is narrower in a state where the imaging unit 10 is not supported by the bracket 20 as illustrated in FIG. 5 than in a state where the imaging unit 10 is supported by the bracket 20 as illustrated in FIG. 1. In addition, the biasing part 24a is provided in a leaf spring shape which is elastically deformed by receiving a force in the up-down direction which is the support direction DS of the imaging unit 10. As a result, the biasing part 24a biases the supported part 15 toward the supporting part 24b in a state where the imaging unit 10 is supported by the bracket 20.

The supporting part 24b faces the biasing part 24a in the attachment direction DF which is, for example, a direction crossing the light axis OA direction of the imaging unit 10 and the width direction DW of the imaging unit 10. The supporting part 24b supports the supported part 15 of the imaging unit 10 from the support direction DS crossing the attachment direction DF of the imaging unit 10 and the light axis OA direction.

In addition, each of the support structural parts 24 has a receiving port 24c between the biasing part 24a and the supporting part 24b. The receiving port 24c is open rearward in the attachment direction DF of the imaging unit 10 and receives the supported part 15 of the imaging unit 10 in the attachment direction DF.

As described above, the first support structural part 25 has the biasing part 24a, the supporting part 24b, and the receiving port 24c. The pair of first support structural parts 25 can be provided symmetrically with respect to a center line of the bracket 20 in the width direction DW of the imaging unit 10 from the viewpoint of suppressing twisting of the casing 12 of the imaging unit 10. The biasing part 24a of the first support structural part 25 extends from the rear side to the front side of the receiving port 24c in the attachment direction DF of the imaging unit 10. The supporting part 24b of the first support structural part 25 has an engagement recess 27. The engagement recess 27 is provided to be recessed in the support direction DS of the imaging unit 10 and is engaged with the supported part 15 of the imaging unit 10.

In the examples illustrated in FIGS. 1 and 5, the support direction DS of the imaging unit 10 in the first support structural part 25 is the up-down direction along the vertical direction. The engagement recess 27 supports the two supported points 15a of the first supported part 16 of the imaging unit 10 from below, and the biasing part 24a operates the biasing force F toward the load point 15b of the first supported part 16 from above.

Incidentally, in the illustrated example, the supporting part 24b of the first support structural part 25 has a claw-shaped engaging part 25a extending downward from the upper side of the biasing part 24a in the support direction DS of the imaging unit 10 on the front side of the biasing part 24a in the attachment direction DF of the imaging unit 10. The engaging part 25a has the engagement recess 27 provided at a lower end in the support direction DS of the imaging unit 10, and a guide surface 25b extending from a lower side of the receiving port 24c to the receiving port 24c in the support direction DS of the imaging unit 10.

In addition, in the illustrated example, the engagement recess 27 provided in the supporting part 24b of the first support structural part 25 has an inclined surface 27a that is inclined rearward in the attachment direction DF with respect to the support direction DS (z-axis direction) of the imaging unit 10 at a rear end of the attachment direction DF of the imaging unit 10. Further, the engagement recess 27 has an inclined surface 27b that is inclined forward in the attachment direction DF of the imaging unit 10 with respect to the support direction DS of the imaging unit 10 at a front end in the attachment direction DF of the imaging unit 10. With the inclined surfaces 27a and 27b, the engagement recess 27 has a substantially V shape in a side view as illustrated in FIG. 1.

Figure 7:
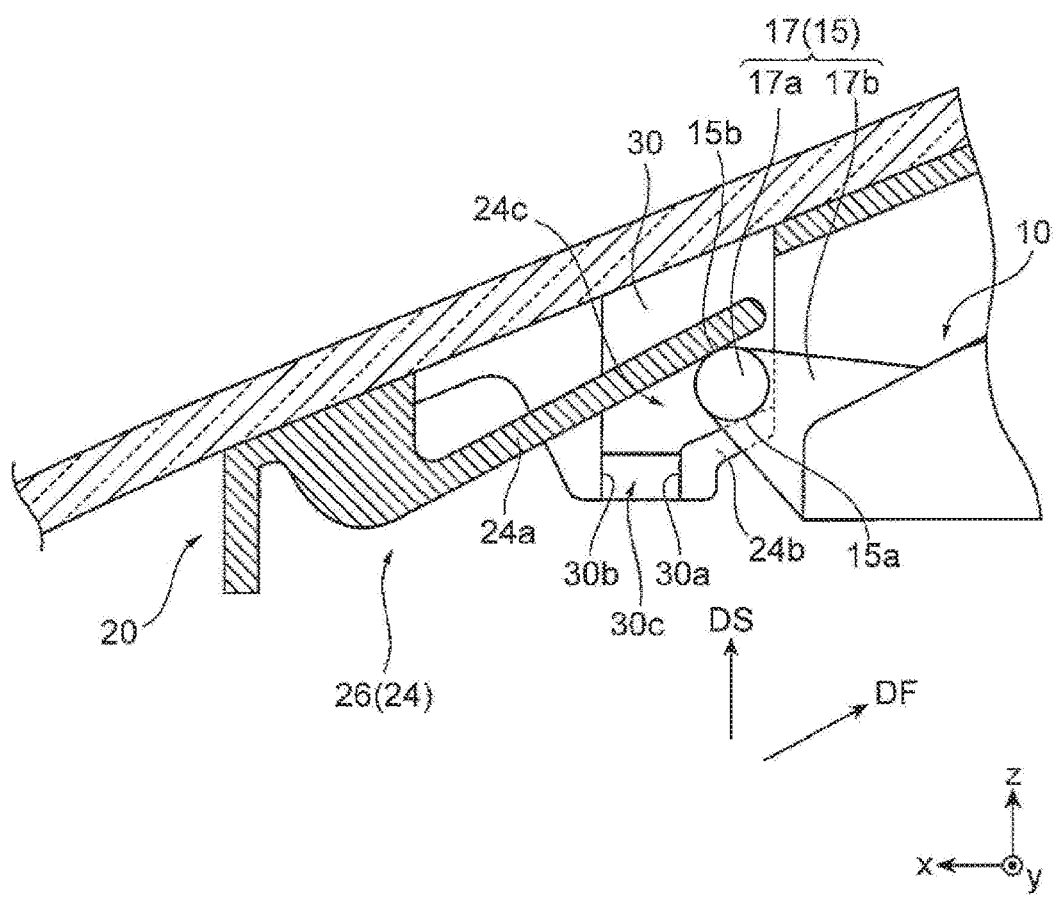
FIG. 7 is an enlarged cross-sectional view taken along line VII-VII of a second support structural part of the bracket illustrated in FIG. 5.

FIG. 7 is an enlarged cross-sectional view taken along line VII-VII of the second support structural part 26 of the bracket 20 illustrated in FIG. 5. Incidentally, FIG. 7 illustrates a state where the second supported part 17 of the imaging unit 10 is held by the second support structural part 26.

In the imaging device 1 of the present embodiment, the second support structural part 26 of the bracket 20 has the biasing part 24a, the supporting part 24b, and the receiving port 24c as described above. The biasing part 24a of the second support structural part 26 extends from the rear side to the front side of the receiving port 24c in the attachment direction DF of the imaging unit 10.

Incidentally, in the imaging device 1 of the present embodiment, the second support structural part 26 of the bracket 20 has a pair of guide walls 30 extending in the up-down direction, which is the support direction DS of the imaging unit 10, and facing each other in the width direction DW (y-axis direction) of the imaging unit 10 as illustrated in FIG. 5. The supporting parts 24b of the second support structural part 26 protrude from surfaces of the pair of guide walls 30 facing each other so as to face each other in the width direction DW of the imaging unit 10 at the lower ends of the guide walls 30.

As illustrated in FIG. 7, each of the pair of guide walls 30 of the second support structural part 26 has a first guide surface 30a, a second guide surface 30b, and an introducing port 30c on surfaces facing each other in the width direction DW of the imaging unit 10. The first guide surface 30a extends vertically from the lower side of the receiving port 24c, which receives the second supported part 17 of the imaging unit 10, to the receiving port 24c. The second guide surface 30b extends vertically to face the first guide surface 30a on the rear side in the attachment direction DF of the imaging unit 10. The introducing port 30c is open downward between the first guide surface 30a and the second guide surface 30b, and receives the second supported part 17 of the imaging unit 10 upward.

Figure 8:
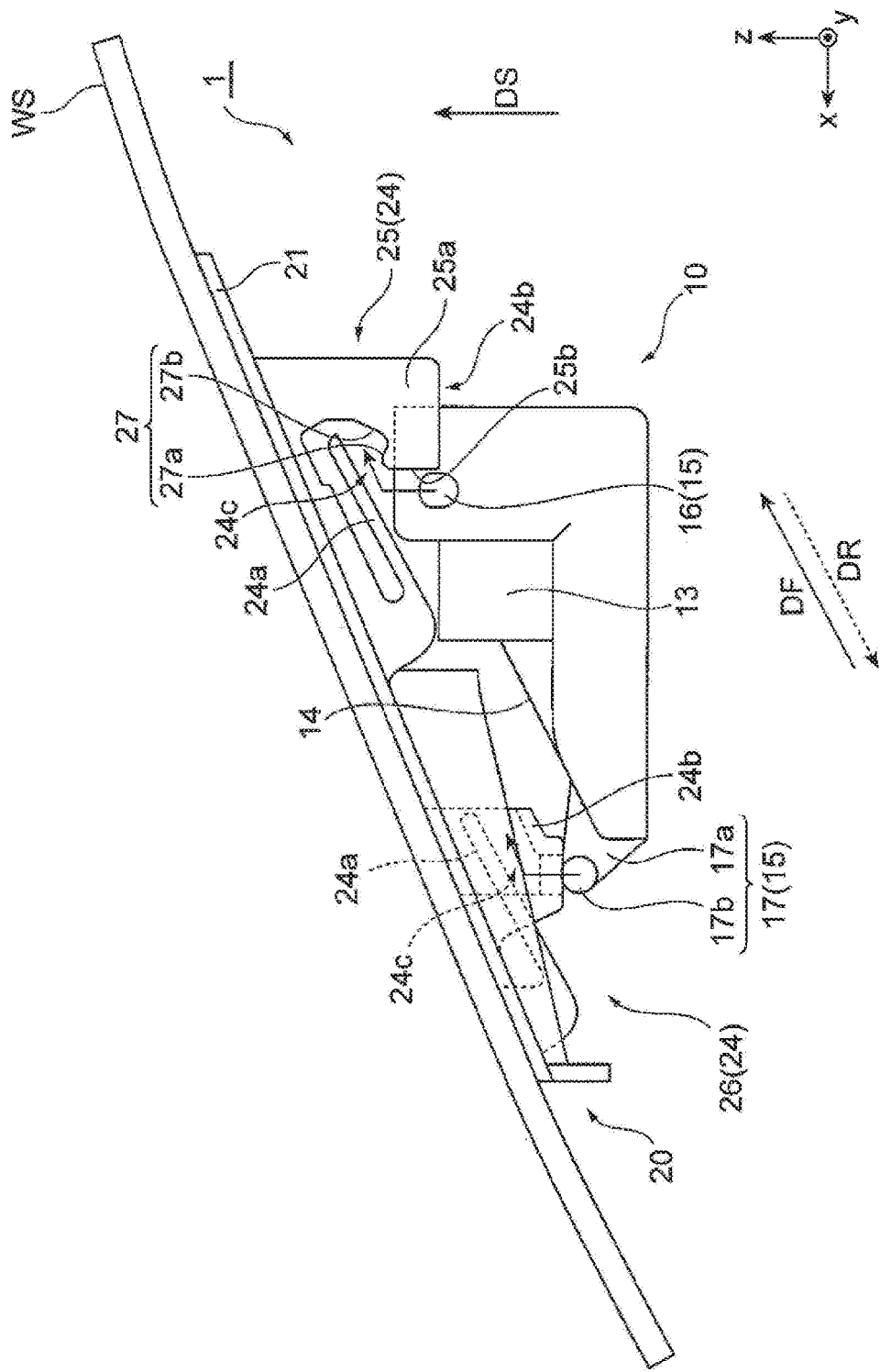
FIG. 8 is a side view for describing a procedure of attaching the imaging unit to the bracket of the imaging device illustrated in FIG. 1.

Hereinafter, action of the imaging device 1 of the present embodiment will be described. FIG. 8 is a side view for describing a procedure of attaching the imaging unit 10 to the bracket 20 in the imaging device 1 of the present embodiment illustrated in FIG. 1.

As described above, the imaging device 1 of the present embodiment includes the imaging unit 10 attachable to the bracket 20. The imaging unit 10 is provided with the plurality of supported parts 15 to be supported by the bracket 20. In addition, the plurality of supported parts 15 is provided on both the ends of the imaging unit 10 in the width direction DW crossing the light axis OA direction at one end of the imaging unit 10 in the light axis OA direction, and in the center part in the width direction DW at the other end of the imaging unit 10 in the light axis OA direction. Further, the supported part 15 has the supported point 15a supported by the bracket 20 and the load point 15b which receives the biasing force F operating toward the supported point 15a from the bracket 20.

In the imaging device 1 having such a configuration, for example, the imaging unit 10 can be attached to the bracket 20 fixed to the upper part of the windshield WS of the vehicle by the following procedure. First, the plurality of supported parts 15 of the imaging unit 10 is positioned with the plurality of support structural parts 24 of the bracket 20. Further, the imaging unit 10 is slid in the attachment direction DF such that each of the plurality of supported parts 15 of the imaging unit 10 is received by the receiving port 24c between the biasing part 24a and the supporting part 24b in each of the plurality of support structural parts 24 of the bracket 20.

After receiving the plurality of supported parts 15 of the imaging unit 10 by the receiving ports 24c of the plurality of support structural parts 24 of the bracket 20, the imaging unit 10 is further slid in the attachment direction DF such that the plurality of supported parts 15 of the imaging unit 10 moves forward in the attachment direction DF from the receiving ports 24c of the plurality of support structural parts 24 of the bracket 20. As a result, each of the plurality of supported parts 15 of the imaging unit 10 is arranged between the biasing part 24a and the supporting part 24b of each of the plurality of support structural parts 24 of the bracket 20, and the biasing part 24a is elastically deformed upward in the support direction DS of the imaging unit 10.

As a result, the biasing force F operates on the load points 15b of the plurality of supported parts 15 of the imaging unit 10 from the biasing parts 24a of the plurality of support structural parts 24 of the bracket 20 toward the supported points 15a on the lower side in the support direction DS of the imaging unit 10. In addition, the drag against the biasing force F operates on the supported points 15a of the plurality of supported parts 15 of the imaging unit 10 from the supporting parts 24b of the plurality of support structural parts 24 of the bracket 20. As described above, the imaging unit 10 is attached to the bracket 20.

In this manner, the plurality of supported parts 15 of the imaging unit 10 to be supported by the bracket 20 is arranged on both the ends of the imaging unit 10 in the width direction DW at one end of the imaging unit 10 in the light axis OA direction, and in the center part of the imaging unit 10 in the width direction DW at the other end of the imaging unit 10 in the light axis OA direction in the imaging device 1 of the present embodiment. As a result, the plurality of supported parts 15 of the imaging unit 10 is arranged at or near a position of an apex of an isosceles triangle having a base substantially parallel to the width direction DW of the imaging unit 10 and a height in a direction substantially parallel to the attachment direction DF along the light axis OA direction of the imaging unit 10.

That is, it is possible to support the imaging unit 10 at three points supported by the bracket 20 or in a state close thereto by supporting the plurality of supported parts 15 of the imaging unit 10 with the bracket 20. Therefore, according to the imaging device 1 of the present embodiment, it is possible to stably support the imaging unit 10 as compared with the conventional case where the four or more pressed portions spaced apart from each other at the front, rear, right, and left of the in-vehicle camera are supported by the bracket.

In addition, it is possible to suppress rolling, which is rotation about the roll axis (x axis), of the imaging unit 10 by supporting the supported parts 15 provided on both the ends in the width direction DW of the imaging unit 10 at the one end of the imaging unit 10 in the light axis OA direction using the bracket 20. Further, it is possible to suppress pitching, which is rotation about the pitch axis (y axis), of the imaging unit 10 by supporting the supported parts 15 at the one end and the other end in the light axis OA direction of the imaging unit 10 by the bracket 20.

In addition, since the biasing force F from the bracket 20 is received by the load point 15b of the supported parts 15 provided on both the ends in the width direction DW of the imaging unit 10 at one end of the imaging unit 10 in the light axis OA direction, it is possible to suppress yawing, which is rotation about the yaw axis (z axis), of the imaging unit 10. Therefore, the imaging unit 10 can be stably positioned with high accuracy by supporting the supported part 15 of the imaging unit 10 with the bracket 20 according to the imaging device 1 of the present embodiment.

In addition, in the imaging device 1 of the present embodiment, each of the supported parts 15 of the imaging unit 10 supported by the bracket 20 has the supported point 15a supported by the bracket 20, and the load point 15b which receives the biasing force F operating from the bracket 20 toward the supported point 15a. More specifically, the supported part 15 of the imaging unit 10 is supported from the lower side in the support direction DS of the imaging unit 10 by the bracket 20 at the supported point 15a, and the biasing force F is applied by the bracket 20 at the load point 15b from the upper side in the support direction DS of the imaging unit 10.

As a result, a portion where the bracket 20 and the imaging unit 10 contact each other can be reduced as much as possible. In addition, the supported part 15 of the imaging unit 10 can allow relative displacement between the bracket 20 and the support structural part 24 in the attachment direction DF and the width direction DW that cross with the support direction DS of the imaging unit 10. Therefore, it is possible to mitigate the stress acting on the casing 12 when attaching the imaging unit 10 to the bracket 20. In addition, it is possible to mitigate the stress acting on the casing 12 and to suppress the deformation of the casing 12 by allowing relative displacement caused by the differences in the amount of thermal expansion between the bracket 20 and the imaging unit 10. As a result, it is possible to reduce the adverse effects on the imaging unit 10.

In addition, the plurality of supported parts 15 of the imaging unit 10 in the imaging device 1 of the present embodiment has the pair of first supported parts 16 provided at the rear end of the imaging unit 10 in the light axis OA direction and the second supported part 17 provided at the front end of the imaging unit 10 in the light axis OA direction. As a result, the pair of first supported parts 16 is supported by the bracket 20, it is possible to more effectively suppress the rolling and pitching at the rear end of the imaging unit 10 in the light axis OA direction where the camera 11 is arranged, and it is possible to further reduce the adverse effects on the imaging unit 10.

In addition, the second supported part 17 of the imaging unit 10 in the imaging device 1 of the present embodiment has the pair of supported points 15a and the single load point 15b between the pair of supported points 15a in the width direction DW of the imaging unit 10. As a result, the two supported points 15a of the second supported part 17 aligned in the width direction DW of the imaging unit 10 are supported by the bracket 20, and it is possible to more stably support the second supported part 17 provided in the center part of the imaging unit 10 in the width direction DW.

In addition, the width direction DW of the imaging unit 10 is substantially parallel to the pitch axis (y axis) and substantially perpendicular to the roll axis (x axis) in the imaging device 1 of the present embodiment. Therefore, as the two supported points 15a of the second supported part 17 aligned in the width direction DW of the imaging unit 10 are supported by the bracket 20, the rolling at the front end of the imaging unit 10 in the light axis OA direction is more effectively suppressed so that it is possible to more stably support the imaging unit 10.

In addition, the second supported part 17 of the imaging unit 10 in the imaging device 1 of the present embodiment has the first portion 17a protruding forward in the light axis OA direction of the imaging unit 10 from the center part of the imaging unit 10 in the width direction DW and the second portion 17b extending from the front end of the first portion 17a in the light axis OA direction to both the sides in the width direction DW. As a result, it is possible to provide the pair of supported points 15a in the second portion 17b of the second supported part 17 on both the ends of the imaging unit 10 in the width direction DW at the lower end in the support direction DS of the imaging unit 10. In addition, it is possible to provide the single load point 15b in the second portion 17b of the second supported part 17 in the center part of the imaging unit 10 in the width direction DW at the upper end in the support direction DS of the imaging unit 10.

In addition, the first supported part 16 of the imaging unit 10 in the imaging device 1 of the present embodiment has the two supported points 15a aligned in the light axis OA direction of the imaging unit 10. In this manner, it is possible to more effectively suppress the pitching, which is the rotation about the pitch axis (y axis) substantially perpendicular to the light axis OA direction of the imaging unit 10, on both the ends of the imaging unit 10 in the width direction DW at the rear end in the light axis OA direction of the imaging unit 10. Therefore, it is possible to more stably support the imaging unit 10.

In addition, the imaging unit 10 in the imaging device 1 of the present embodiment includes the pair of cameras 11 aligned in the width direction DW. Further, the pair of cameras 11 is arranged on both the ends of the imaging unit 10 in the width direction DW to be adjacent to the pair of first supported parts 16 of the imaging unit 10. Thus, the vicinity of the pair of cameras 11 of the imaging unit is supported by the bracket 20, and positional deviation of the pair of cameras 11 is prevented, whereby it is possible to precisely position the light axes OA of the pair of cameras 11. Therefore, it is possible to improve measurement accuracy of a distance of a subject or the like using the imaging unit 10.

In addition, the imaging device 1 of the present embodiment can include the bracket 20 to which the imaging unit 10 is attachable as described above. The bracket 20 has the plurality of support structural parts 24 that supports the plurality of supported parts 15 of the imaging unit 10. The support structural parts 24 has the biasing parts 24a that apply the biasing force F on the load point 15b of the supported part 15 of the imaging unit 10 and the supporting parts 24b that operate a drag against the biasing force F on the supported points 15a of the supported part 15 of the imaging unit 10. The biasing part 24a extends along the light axis OA direction of the imaging unit 10, and has one end in the light axis OA direction serving as the fixed end and the other end in the light axis OA direction serving as the free end. The supporting part 24b faces the biasing part 24a in the support direction DS of the imaging unit 10 crossing the light axis OA direction of the imaging unit 10 and the width direction DW of the imaging unit 10.

With such a configuration, the imaging device 1 of the present embodiment can hold the plurality of supported parts 15 from the support direction DS of the imaging unit 10 by the biasing parts 24a and the supporting parts 24b of the plurality of support structural parts 24 of the bracket 20. Further, the supported point 15a of the supported part 15 of the imaging unit 10 is supported by the supporting part 24b of the bracket 20, and it is possible to operate the biasing force F toward the supported point 15a at the load point 15b of the supported part 15 of the imaging unit 10 by the biasing part 24a of the bracket 20.

In addition, the supporting part 24b of the first support structural part 25 of the bracket 20 in the imaging device 1 of the present embodiment has the engagement recess 27 that is engaged with the first supported part 16 of the imaging unit 10. The engagement recess 27 is provided in the shape of being recessed downward in the up-down direction which is the support direction DS of the imaging unit 10 crossing the attachment direction DF of the imaging unit 10.

Therefore, the first supported part 16 of the imaging unit 10 is engaged downward in the support direction DS crossing the attachment direction DF of the imaging unit 10 with respect to the engagement recess 27 provided in the supporting part 24b of the first support structural part 25 of the bracket 20, whereby the front-rear movement of the imaging unit 10 in the attachment direction DF is restricted. The first supported part 16 of the imaging unit 10 is supported from both the sides in the support direction DS between the engagement recess 27 and the biasing part 24a which face the support direction DS in the first support structural part 25. As a result, even when vibration or shock acts on the imaging unit 10, it is possible to more stably and more reliably support the first supported part 16 of the imaging unit 10 using the first support structural part 25 of the bracket 20.

In addition, the support direction DS of the imaging unit 10 by the bracket 20 is the up-down direction along the vertical direction in the imaging device 1 of the present embodiment. Further, the engagement recess 27 supports the first supported part 16 of the imaging unit 10 from below, and the biasing part 24a supports the first supported part 16 of the imaging unit 10 from above, in the first support structural part 25 of the bracket 20. As a result, it is possible to stable and reliably support the first supported part 16 of the imaging unit 10 from both the sides in the up-down direction using the first support structure portion 25 of the bracket 20.

In addition, the engagement recess 27 provided in the supporting part 24b of the first support structural part 25 of the bracket 20 in the imaging device 1 of the present embodiment has the inclined surface 27a that is inclined rearward in the attachment direction DF of the imaging unit 10 with respect to the support direction DS of the imaging unit 10 at the rear end of the attachment direction DF of the imaging unit 10. As a result, the supported point 15a on the rear side in the attachment direction DF of the imaging unit 10 between the pair of supported points 15a of the first supported part 16 of the imaging unit 10 can be supported by the inclined surface 27a.

In addition, the engagement recess 27 provided in the supporting part 24b of the first support structural part 25 of the bracket 20 in the imaging device 1 of the present embodiment has the inclined surface 27b that is inclined forward in the attachment direction DF of the imaging unit 10 with respect to the support direction DS of the imaging unit 10 at the front end of the attachment direction DF of the imaging unit 10. As a result, the supported point 15a on the front side in the attachment direction DF of the imaging unit 10 between the pair of supported points 15a of the first supported part 16 of the imaging unit 10 can be supported by the inclined surface 27b.

In addition, the second support structural part 26 of the bracket 20 in the imaging device 1 of the present embodiment has the pair of guide walls 30 that vertically extends so as to face the width direction DW of the imaging unit 10. The supporting part 24b of the second support structural part 26 is provided on each of the pair of guide walls 30, and the biasing part 24a is arranged between the pair of guide walls 30.

Thus, the pair of supported points 15a of the second supported part 17 of the imaging unit 10 can be supported by the pair of supporting parts 24b of the second support structural part 26 of the bracket 20. In addition, the biasing force F can be applied at the single load point 15b between the pair of supported points 15a of the second supported part 17 in the width direction DW of the imaging unit 10 by the biasing part 24a between the pair of supporting parts 24b of the second support structural part 26.

In addition, the supported part 15 of the imaging unit 10 in the imaging device 1 of the present embodiment has the cylindrical shape extending in the axial direction along the direction perpendicular to the attachment direction DF and the support direction DS. As a result, it is possible to stably and reliably support the supported part 15 of the imaging unit 10 from the support direction DS crossing the axial direction by the support structural part 24 of the bracket 20.

As described above, according to the imaging device 1 of the present embodiment, the imaging unit 10 can be stably supported by the bracket 20 and adverse effects on the imaging unit 10 caused by differences in the amount of thermal expansion between the bracket 20 and the imaging unit 10 can be reduced.

Second Embodiment

Hereinafter, a second embodiment of the imaging device of the present invention will be described with reference to FIGS. 9 to 12.

Figure 9:
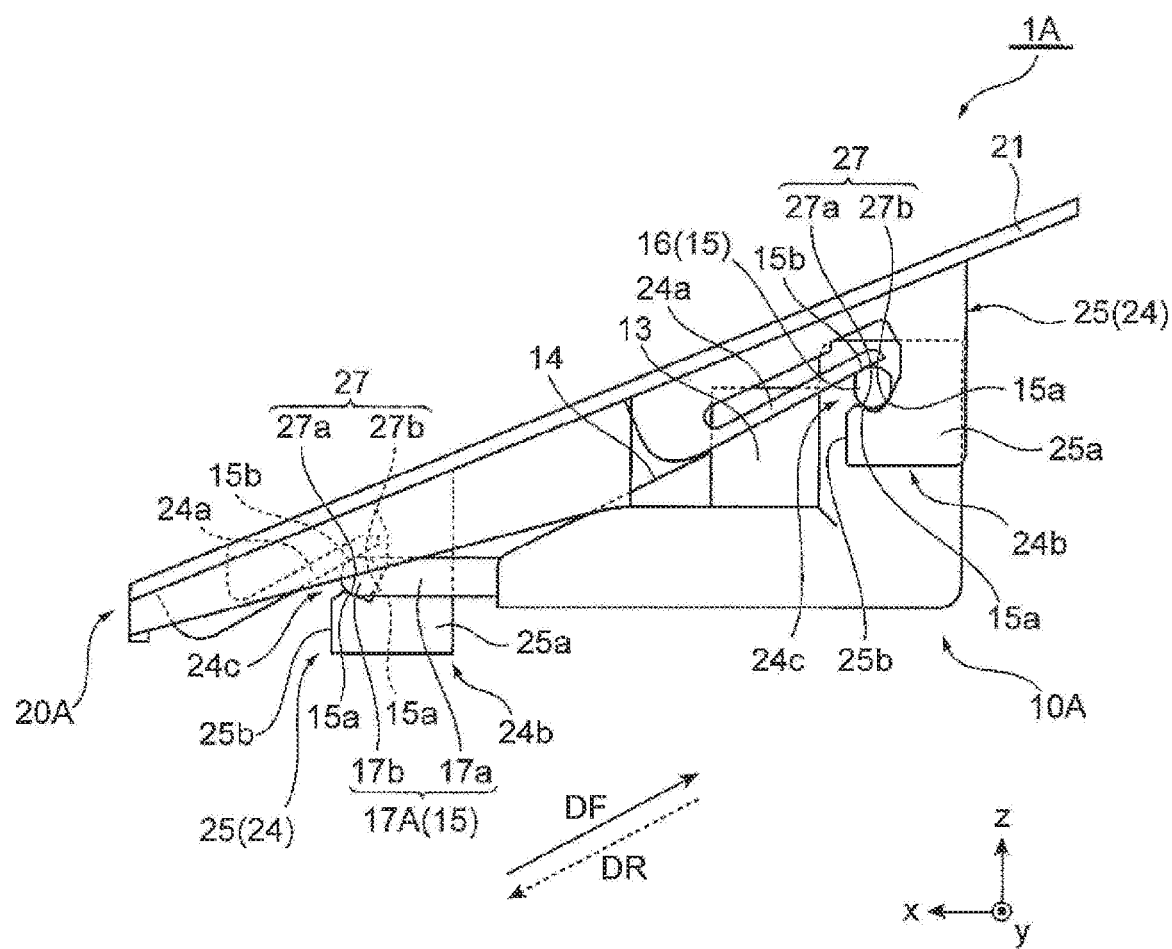
FIG. 9 is a side view of an imaging device according to a second embodiment of the present invention.
Figure 10:
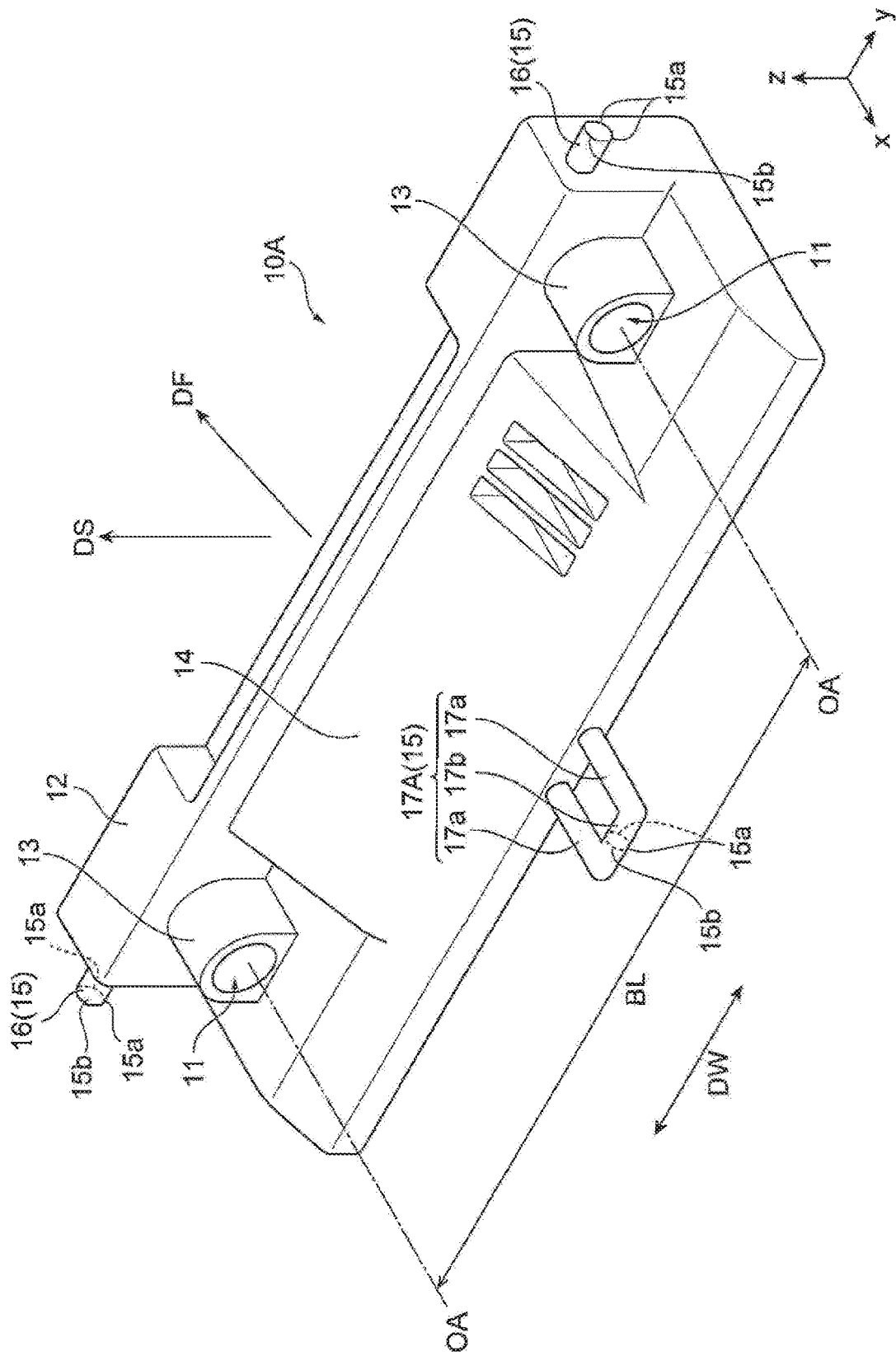
FIG. 10 is a perspective view from the upper side of an imaging unit of the imaging device illustrated in FIG. 9.
Figure 11:
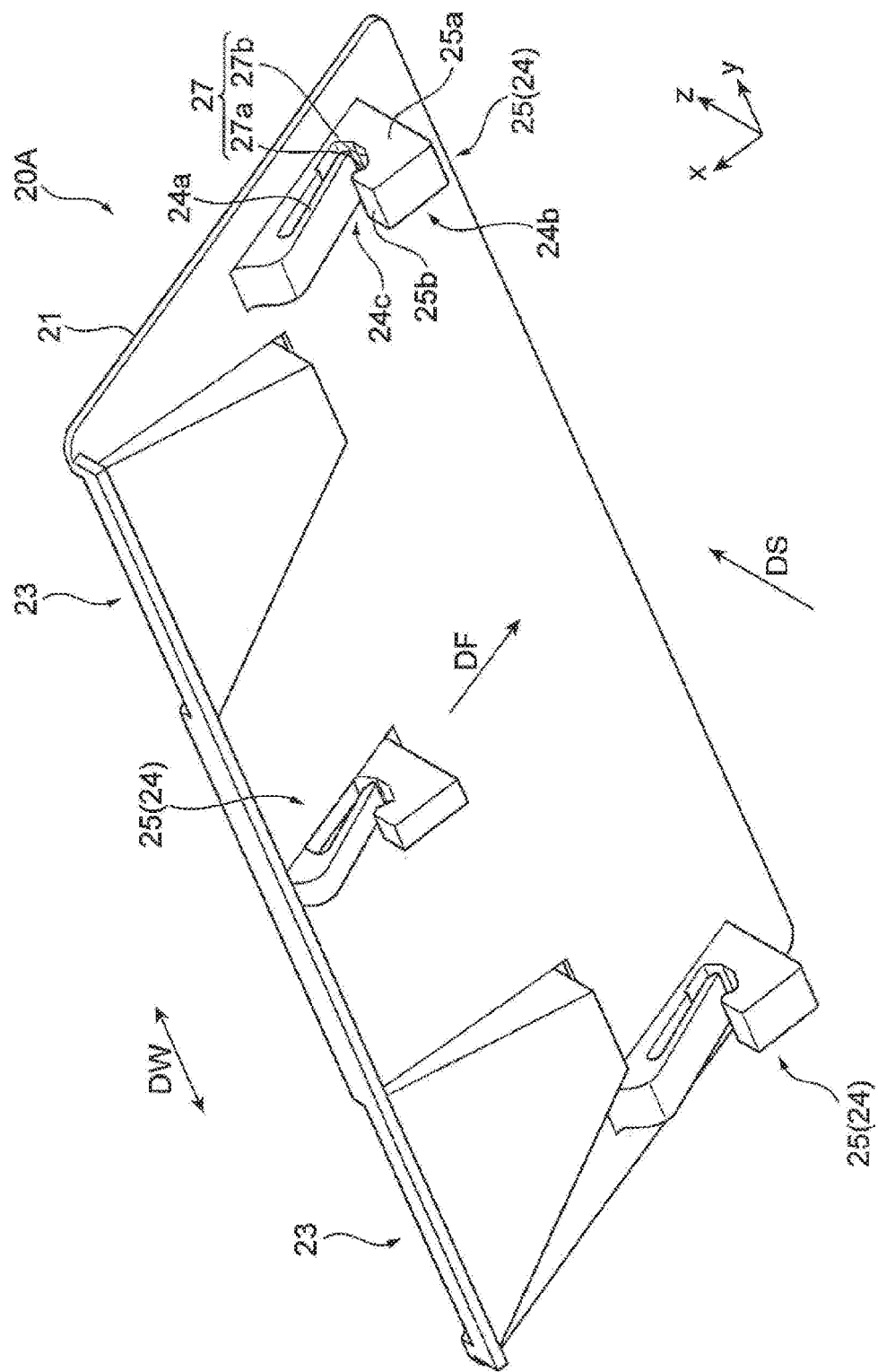
FIG. 11 is a perspective view from the lower side of a bracket of the imaging device illustrated in FIG. 9.

FIG. 9 is a side view of an imaging device 1A according to the second embodiment of the present invention. FIG. 10 is a perspective view from the upper side of an imaging unit 10A of the imaging device 1A illustrated in FIG. 9. FIG. 11 is a perspective view from the lower side of a bracket 20A of the imaging device 1A illustrated in FIG. 9.

The imaging device 1A of the present embodiment is different from the imaging device 1 of the first embodiment in terms of a configuration of a second supported part 17A of the imaging unit 10A and a first support structural part 25 provided instead of the second support structural part 26 at a front end of the bracket 20A in a light axis OA direction of the imaging unit 10A. Other configurations of the imaging device 1A of the present embodiment are the same as those of the imaging device 1 of the first embodiment described above, and thus, the same parts will be denoted by the same reference signs and the description thereof is omitted.

As illustrated in FIGS. 9 and 10, the imaging unit 10A of the imaging device 1A of the present embodiment has the second supported part 17A in a center part in a width direction DW at the front end in the light axis OA direction. The second supported part 17A has a pair of first portions 17a protruding forward in the light axis OA direction of the imaging unit 10A from the center part of the imaging unit 10A in the width direction DW, and a second portion 17b extending in the width direction DW and connecting front ends of the pair of first portions 17a in the light axis OA direction.

In other words, the second supported part 17A includes the pair of first portions 17a protruding rearward in an attachment direction DF from the center part of the imaging unit 10A in the width direction DW and the cylindrical-shaped second portion 17b provided at rear ends of the pair of first portions 17a in the attachment direction DF and extending in the axial direction along the attachment direction DF and a direction perpendicular to a support direction DS.

In the second supported part 17A, the pair of first portions 17a extends substantially in parallel to the light axis OA direction of the imaging unit 10A and a roll axis (x axis) of a vehicle, and the second portion 17b extends in the axial direction substantially perpendicular to the light axis OA direction of the imaging unit 10A and substantially parallel to a pitch axis (y axis) of the vehicle. The second supported part 17A is formed in a substantially U shape in a top view as both axial ends of the second portion 17b are connected to the rear ends of the pair of first portions 17a in the attachment direction DF of the imaging unit 10A, and is formed in an annular shape having an opening between the second supported part 17A and the casing 12 of the imaging unit 10A.

As illustrated in FIGS. 9 and 11, a plurality of support structural parts 24 of the bracket 20A of the imaging device 1A of the present embodiment includes three first support structural parts 25. The bracket 20A has a pair of the first support structural parts 25 at both ends of the imaging unit 10A in the width direction DW at a rear end in the light axis OA direction of the imaging unit 10A, and the single first support structural parts 25 in the center part of the imaging unit 10A in the width direction DW at a front end in the light axis OA direction of the imaging unit 10A.

Figure 12:
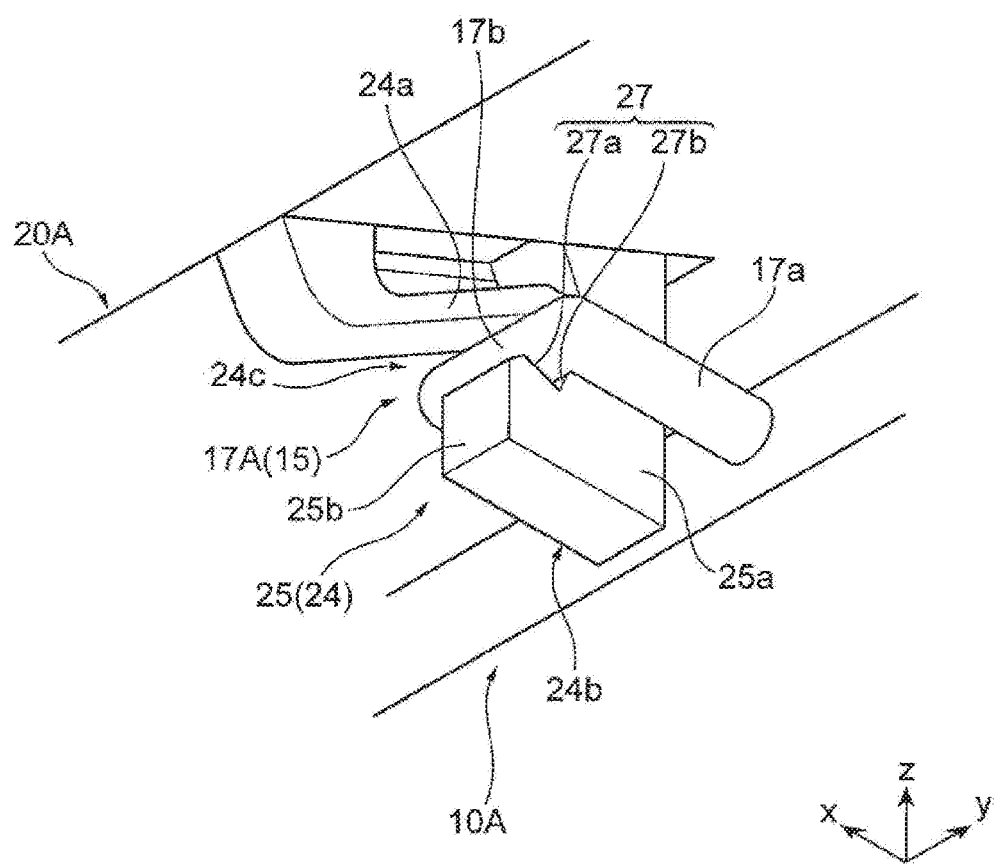
FIG. 12 is an enlarged view of a first support structural part of the bracket illustrated in FIG. 11.

FIG. 12 is an enlarged view of the first support structural part 25 provided at the front end side in the light axis OA direction of the imaging unit 10A of the bracket 20A illustrated in FIG. 11. Incidentally, FIG. 12 illustrates a state where the second supported part 17A of the imaging unit 10A is supported by the first support structural part 25 as illustrated in FIG. 9. According to the imaging device 1A of the present embodiment, the second supported part 17A of the imaging unit 10A is supported by the first support structural part 25 provided at the front end of the bracket 20A in the light axis OA direction of the imaging unit 10A, which is similar to the first supported part 16 of the imaging unit 10A.

Therefore, according to the imaging device 1A of the present embodiment, it is possible not only to obtain the same effects as those of the imaging device 1 of the first embodiment but also to more stably and more reliably support the second supported part 17A of the imaging unit 10A by the first support structural part 25 provided at the front end of the bracket 20A in the light axis OA direction of the imaging unit 10A.

Third Embodiment

Hereinafter, a third embodiment of the imaging device of the present invention will be described with reference to FIGS. 13 to 15.

Figure 13:
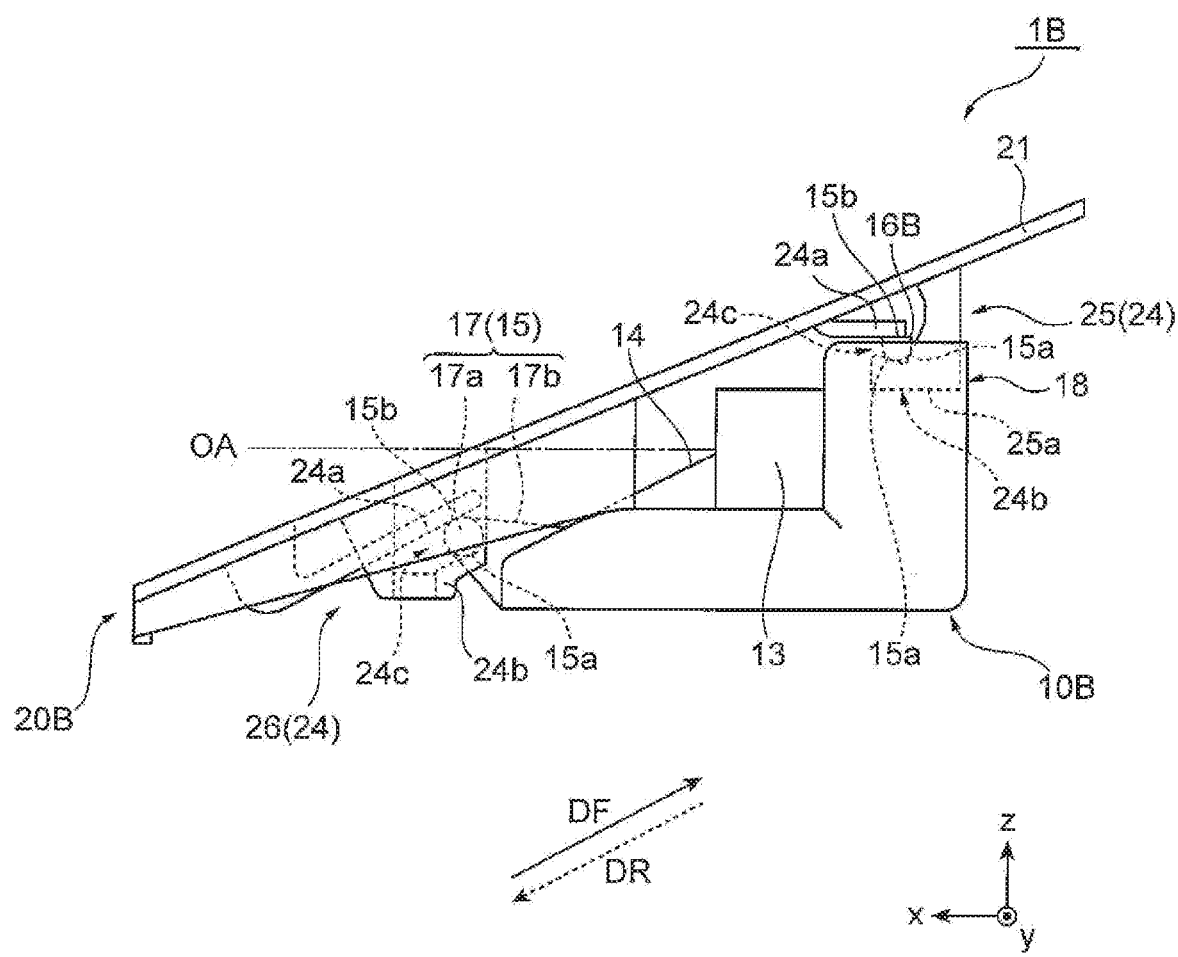
FIG. 13 is a side view of an imaging device according to a third embodiment of the present invention.

FIG. 13 is a side view of an imaging device 1B according to the third embodiment of the present invention. FIG. 14 is a perspective view from the upper side of an imaging unit 10B of the imaging device 1B illustrated in FIG. 13. FIG. 15 is a perspective view from the lower side of a bracket 20B of the imaging device 1B illustrated in FIG. 13.

The imaging device 1B of the present embodiment is different from the imaging device 1 of the first embodiment in terms of a configuration of a first supported part 16B of the imaging unit 10B. Other configurations of the imaging device 1B of the present embodiment are the same as those of the imaging device 1 of the first embodiment described above, and thus, the same parts will be denoted by the same reference signs and the description thereof is omitted.

Figure 14:
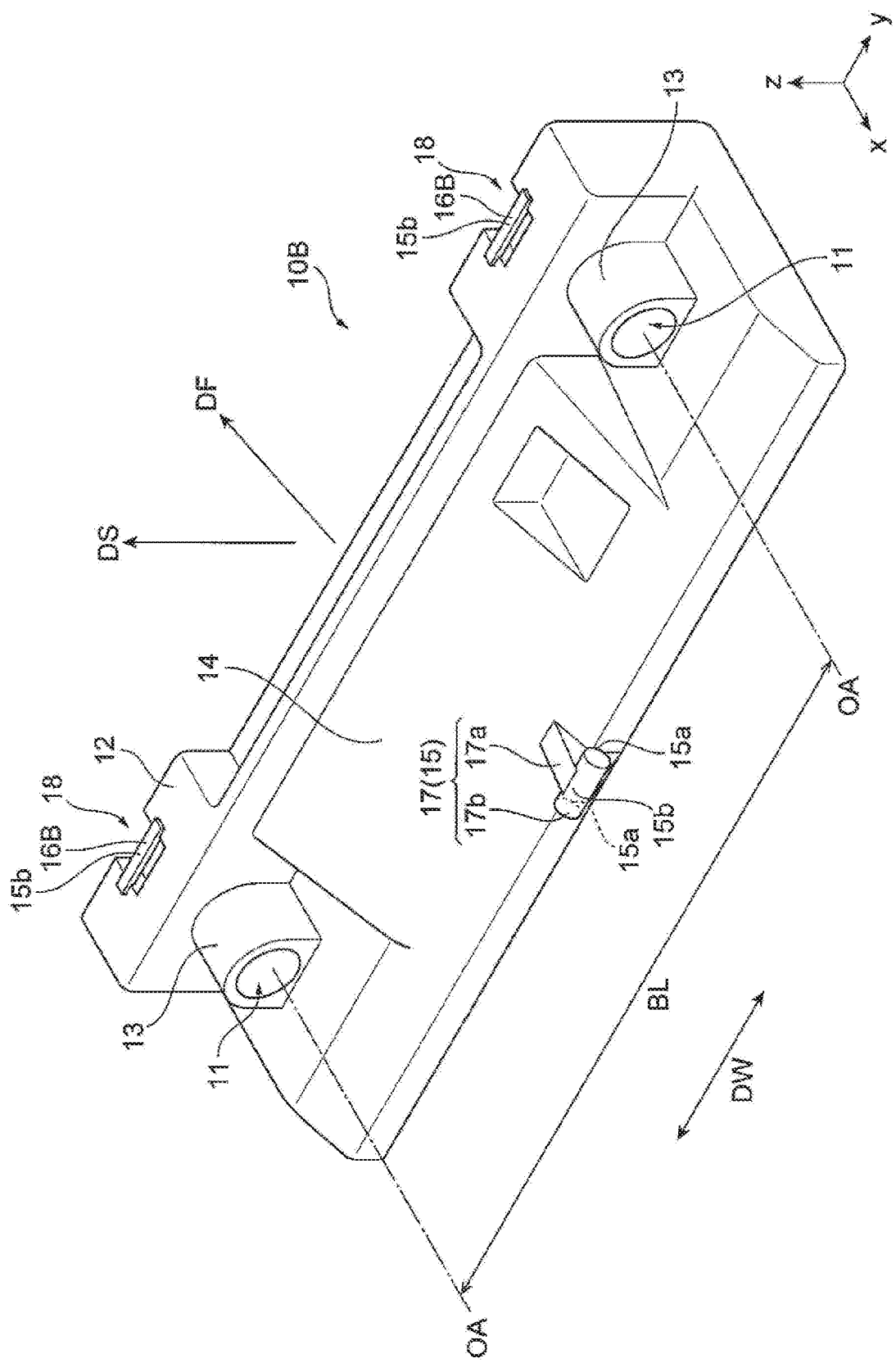
FIG. 14 is a perspective view from the upper side of an imaging unit of the imaging device illustrated in FIG. 13.
Figure 15:
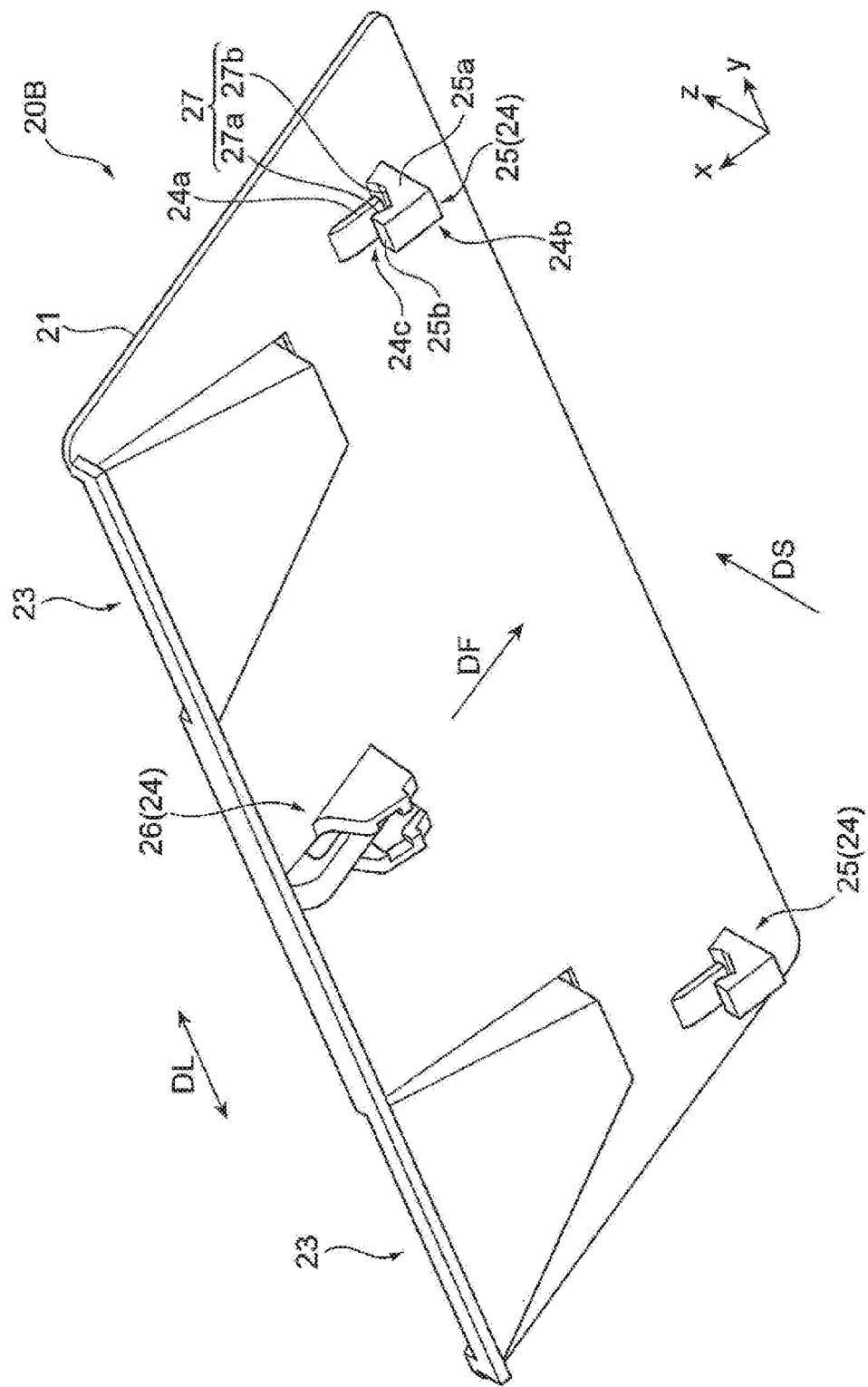
FIG. 15 is a perspective view from the lower side of a bracket of the imaging device illustrated in FIG. 13.

As illustrated in FIGS. 13 and 14, the imaging unit 10B of the imaging device 1B of the present embodiment has a pair of recesses 18 which accommodates lower ends of a pair of first support structural parts 25 of the bracket 20B on both ends in a width direction DW at a rear end of a casing 12 in a light axis OA direction. The imaging unit 10B has a pair of the first supported parts 16B crossing the pair of recesses 18 on an upper end surface of the casing 12 in a support direction DS.

The first supported part 16B of the imaging unit 10B is provided in a cylindrical shape having a width direction DW of the imaging unit 10B as its axial direction, and both axial ends thereof are fixed to the casing 12. As illustrated in FIG. 13, the first supported part 16B has a semicircular columnar shape having a flat surface to be supported by a biasing part 24a of the first support structural part 25 of the bracket 20B. The pair of first support structural parts 25 of the bracket 20B is made smaller than the pair of first support structural parts 25 provided in the bracket 20 of the imaging device 1 of the first embodiment illustrated in FIG. 5, and has lower ends that can be easily accommodated in the recesses 18 of the casing 12 of the imaging unit 10B.

According to the imaging device 1B of the present embodiment, it is possible not only to obtain the same effects as those of the imaging device 1 of the first embodiment but also to arrange the pair of first support structural parts 25 of the bracket 20B at the inner side of both the ends of the imaging unit 10B in the width direction DW without causing the pair of first supported parts 16B of the imaging unit 10B to protrude in the width direction DW of the imaging unit 10B. Therefore, it is possible to reduce a size and weight of the imaging device 1B.

Fourth Embodiment

Hereinafter, a fourth embodiment of the imaging device of the present invention will be described with reference to FIGS. 16 to 18.

Figure 16:
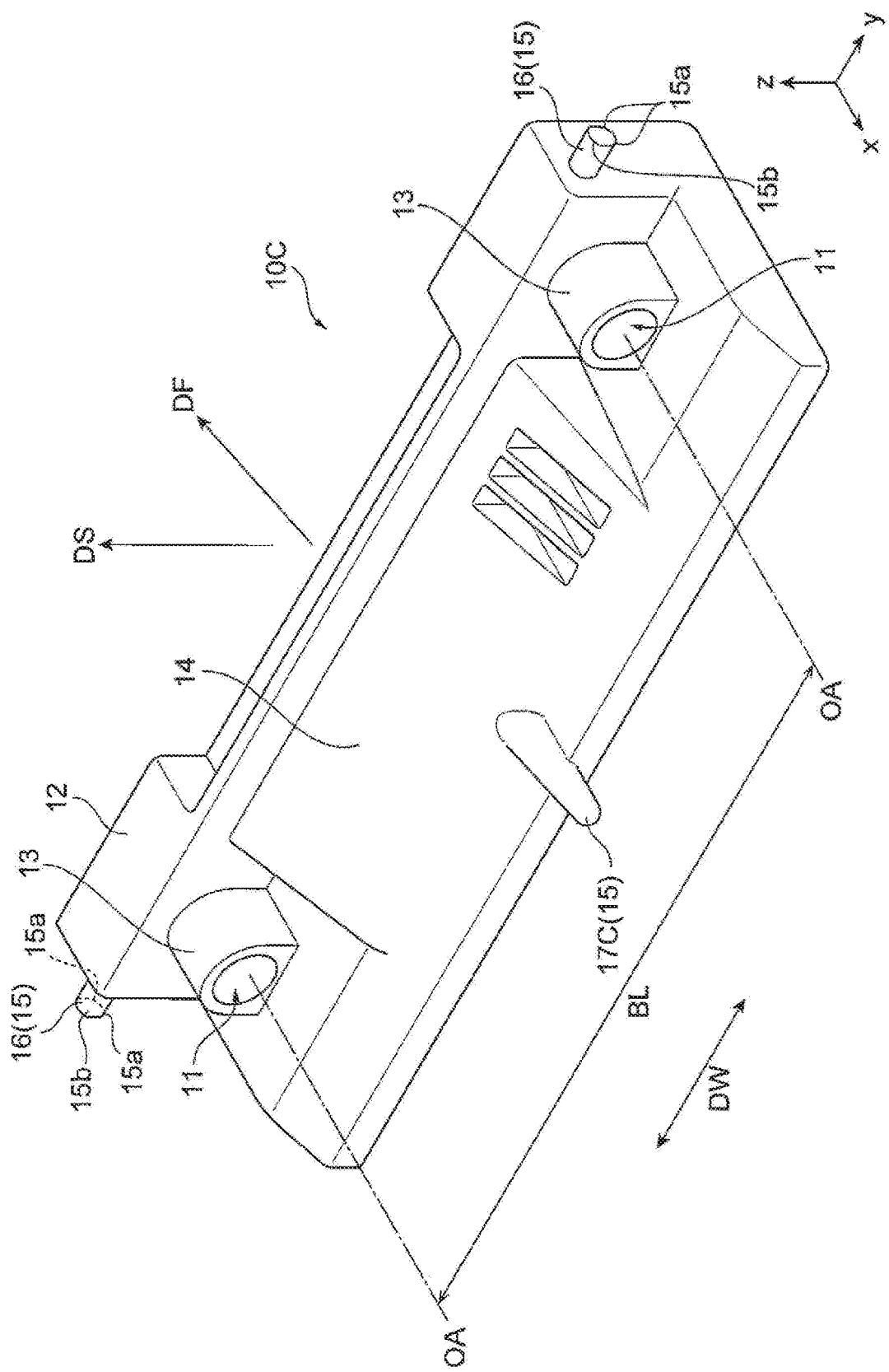
FIG. 16 is a perspective view from the upper side of an imaging unit of an imaging device according to a fourth embodiment of the present invention.

FIG. 16 is a perspective view from the upper side of an imaging unit 10C of an imaging device 1C according to the fourth embodiment of the present invention. FIG. 17 is a perspective view from the lower side of a bracket 20C to which the imaging unit 10C illustrated in FIG. 16 can be attached. FIG. 18 is an enlarged perspective view illustrating a state where a second supported part 17C of the imaging unit 10C illustrated in FIG. 16 is supported by the bracket 20C illustrated in FIG. 17.

The imaging device 1C of the present embodiment is different from the imaging device 1 of the first embodiment in terms of a configuration of a second supported part 17C of the imaging unit 10C and a third support structural part 28 provided instead of the second support structural part 26 at a front end of the bracket 20C in a light axis OA direction (x-axis direction) of the imaging unit 10C. Other configurations of the imaging device 1C of the present embodiment are the same as those of the imaging device 1 of the first embodiment described above, and thus, the same parts will be denoted by the same reference signs and the description thereof is omitted.

Figure 18:
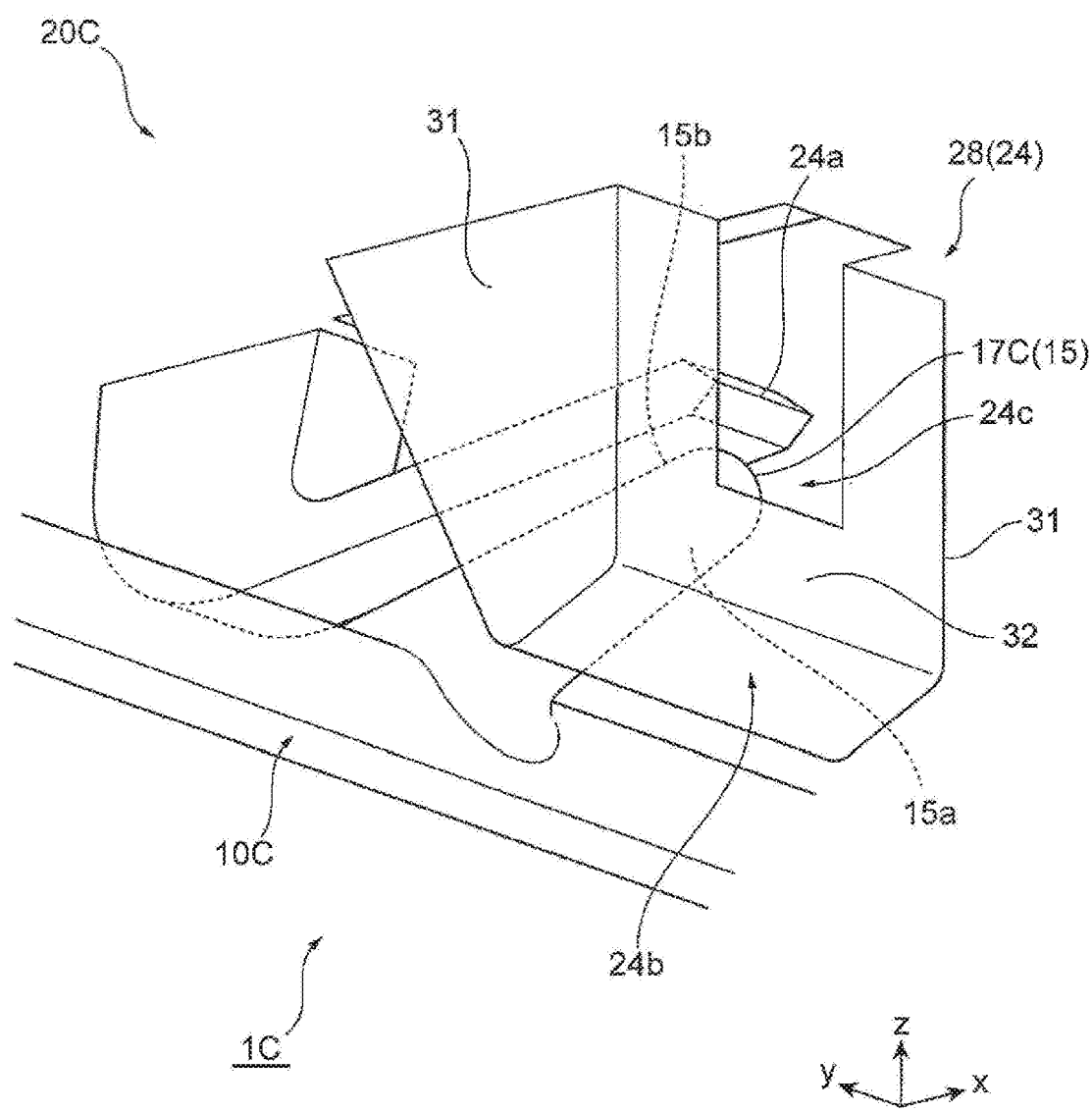
FIG. 18 is an enlarged perspective view of a second supported part of the imaging unit illustrated in FIG. 16.

As illustrated in FIGS. 16 and 18, the imaging unit 10C of the imaging device 1C of the present embodiment has the second supported part 17C in a center part in a width direction DW at the front end in the light axis OA direction (x-axis direction). The second supported part 17C has a conical shape with a spherical distal end protruding forward from a casing 12 of the imaging unit 10C in the light axis OA direction.

Figure 17:
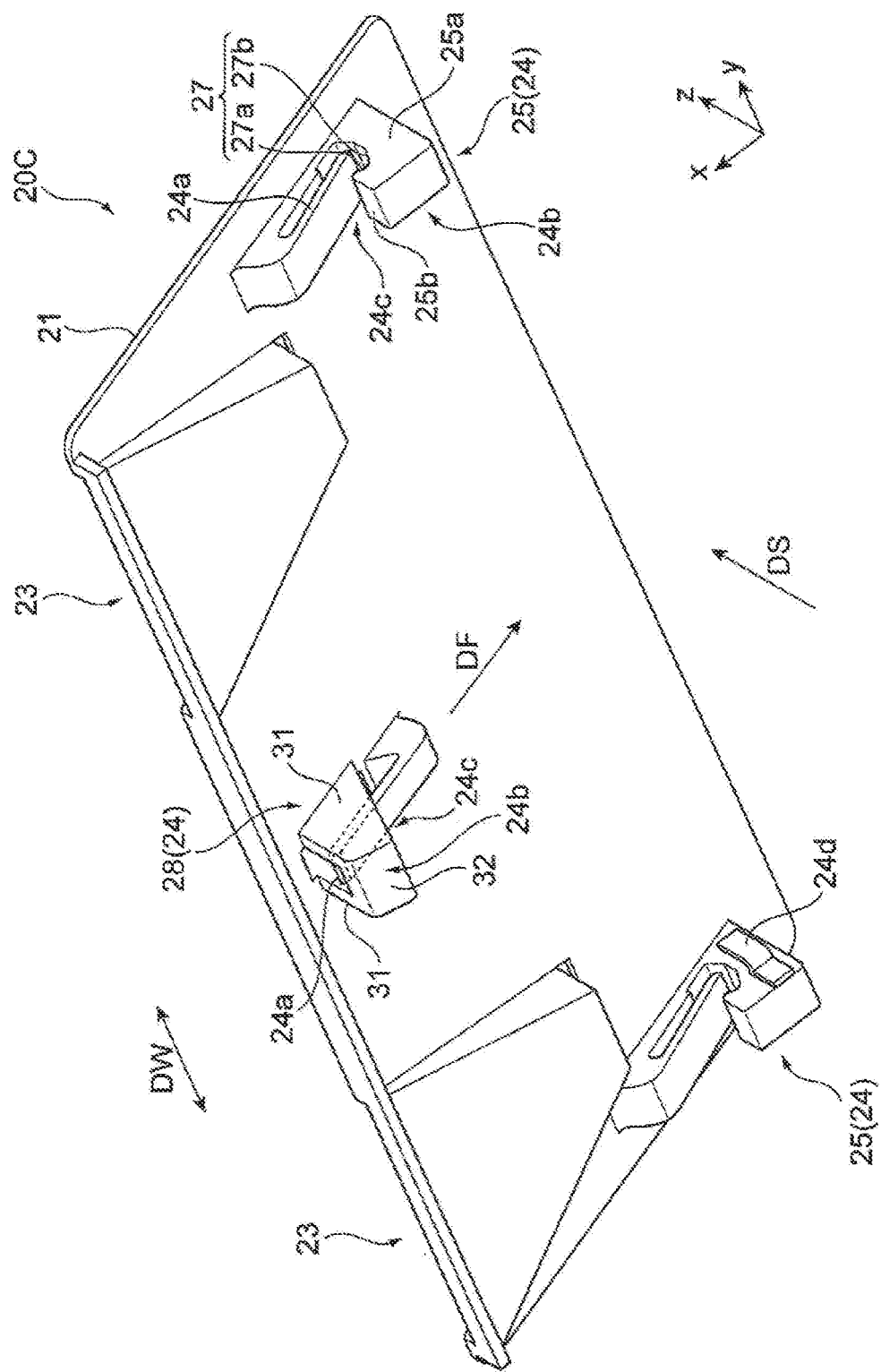
FIG. 17 is a perspective view from the lower side of a bracket to which the imaging unit illustrated in FIG. 16 can be attached.

As illustrated in FIGS. 17 and 18, the bracket 20C of the imaging device 1C of the present embodiment has the third support structural part 28, as the support structural part 24 supporting the second supported part 17C of the imaging unit 10C, in the center part in the width direction DW at the front end in the light axis OA direction (x-axis direction). The third support structural part 28 has a biasing part 24a, a supporting part 24b, and a receiving port 24c, which is similar to the second support structural part 26 of the imaging device 1 of the first embodiment. However, the biasing part 24a of the third support structural part 28 has a rear end in the light axis OA direction serving as a fixed end, and a front end in the light axis OA direction serving as a free end.

In addition, the supporting part 24b of the third support structural part 28 is formed in a portal shape that has a pair of side walls 31 extending downward from a main body 21 of the bracket 20C and arranged on both sides of the biasing part 24a, and a bottom wall 32 connecting lower ends of the pair of side walls 31. In addition, the receiving port 24c of the third support structural part 28 is open forward and rearward in the light axis OA direction, and receives the second supported part 17C of the imaging unit 10C from the rear to the front in the light axis OA direction.

According to the imaging device 1C of the present embodiment, the second supported part 17C of the imaging unit 10C is supported by the third support structural part 28 provided at the front end of the bracket 20C in the light axis OA direction of the imaging unit 10C. At this time, a supported point 15a on a lower side of the second supported part 17C of the imaging unit 10C is supported by the supporting part 24b of the third support structural part 28 of the bracket 20C. In addition, a load point 15b on the upper side of the second supported part 17C of the imaging unit 10C receives a biasing force operating toward the supported point 15a from the biasing part 24a of the third support structural part 28 of the bracket 20C.

Therefore, according to the imaging device 1C of the present embodiment, it is possible not only to obtain the same effects as those of the imaging device 1 of the first embodiment but also to facilitate manufacture by simplifying the structure of the second supported part 17C of the imaging unit 10C. Incidentally, at least one of a pair of first support structural parts 15 of the bracket 20C may have a second biasing part 24d that biases a side surface in the width direction DW of the casing 12 of the imaging unit 10C toward the other first support structural part 15 in the present embodiment. As a result, it is possible to more stably support the imaging unit 10C with the bracket 20C.

Although the embodiment of the present invention has been described in detail with reference to the drawings as above, a specific configuration is not limited to the embodiment, and design alterations or the like made in a scope not departing from a gist of the present invention is included in the present invention.

REFERENCE SIGNS LIST 1 imaging device
1A imaging device
1B imaging device
1C imaging device
10 imaging unit
10A imaging unit 10B imaging unit
10C imaging unit
15 supported part
15a supported point
15b load point
16 first supported part
17 second supported part
17A second supported part
17C second supported part
17a first portion
17b second portion
20 bracket
20A bracket
20B bracket
20C bracket
24 support structural part
24a biasing part
24b supporting part
DW width direction
OA light axis

The invention claimed is:

1. An imaging device comprising an imaging unit attachable to a bracket, wherein
the imaging unit comprises a plurality of supported parts to be supported by the bracket,
the plurality of supported parts include first supported parts provided on both ends of the imaging unit in a width direction crossing a light axis direction, and a second supported part provided at a center part in the width direction at another end of the imaging unit and including a projection extending substantially parallel to the light axis direction,
the plurality of supported parts have supported points, which are configured to be supported by the bracket, and load points, which are configured to receive a biasing force operating toward the supported points from the bracket,
the imaging unit comprises a pair of cameras aligned in the width direction,
the pair of cameras are arranged to be adjacent to a pair of the first supported parts, each of the first supported parts located respectively at one of the both ends of the imaging unit in the width direction,
the projection of the second supported part in the width direction is equidistant from the both ends of the imaging unit in the width direction,
the projection of the second supported part in the width direction is equidistant from each one of the pair of cameras, and
the projection of the second supported part tapers from a first thickness at the center part in the width direction to a second thickness that is smaller than the first thickness at a position offset from the center part in the light axis direction.

2. The imaging device according to claim 1, wherein the pair of the first supported parts are provided at a rear end of the imaging unit in the light axis direction and the second supported part is provided at a front end of the imaging unit in the light axis direction.

3. The imaging device according to claim 2, wherein the first supported part has two supported points which are aligned in the light axis direction of the imaging unit.

4. The imaging device according to claim 1, further comprising the bracket to which the imaging unit is attachable,
wherein the bracket has a plurality of support structural parts which support the plurality of supported parts,
the support structural part has a biasing part which causes a biasing force to operate at one or more of the load points of the plurality of supported parts and a support that causes a drag against the biasing force to operate at one or more of the supported points of the plurality of supported parts,
the biasing part extends along the light axis direction of the imaging unit and has one end in the light axis direction as a fixed end and another end in the light axis direction as a free end, and
the support faces the biasing part in a direction crossing the light axis direction of the imaging unit and the width direction of the imaging unit.

5. The imaging device of claim 1, wherein:
the plurality of supported parts include supported parts arranged to correspond to apexes of an isosceles triangle having a base substantially parallel to the width direction of the imaging unit and a height in the light axis direction of the imaging unit.

6. The imaging device of claim 1, wherein a distance from one of the pair of the first supported parts to one of the pair of cameras is equal to or smaller than one-fifth of a distance between light axes of the respective cameras.

* * * * *